United States Patent
Hazenfield

[19]

[11] Patent Number: 5,991,374
[45] Date of Patent: Nov. 23, 1999

[54] PROGRAMMABLE MESSAGING SYSTEM FOR CONTROLLING PLAYBACK OF MESSAGES ON REMOTE MUSIC ON-HOLD-COMPATIBLE TELEPHONE SYSTEMS AND OTHER MESSAGE OUTPUT DEVICES

[76] Inventor: Joey C. Hazenfield, 2677 Little Dry Run Rd., Cincinnati, Ohio 45244

[21] Appl. No.: 08/694,854

[22] Filed: Aug. 8, 1996

[51] Int. Cl.⁶ .................................................. H04M 3/42
[52] U.S. Cl. .................................. 379/101.01; 379/88.11; 379/88.22
[58] Field of Search ................................ 379/67, 74, 76, 379/87, 88, 89, 90.01, 93.01, 101.01, 102.03, 201, 457, 67.1, 88.11, 88.15, 88.16, 88.17, 88.18, 88.22, 88.25; 340/825.44, 825.47, 825.52; 348/6, 7; 455/500, 70, 3.1, 3.2, 6.3, 412, 418, 31.2, 39

[56] References Cited

U.S. PATENT DOCUMENTS

| | | |
|---|---|---|
| 4,446,336 | 5/1984 | Bethel et al. . |
| 4,663,777 | 5/1987 | Szeto ......................................... 379/88 |
| 4,785,408 | 11/1988 | Brittton et al. ....................... 364/513.5 |
| 4,797,909 | 1/1989 | Mastromoro et al. ..................... 379/67 |
| 4,985,913 | 1/1991 | Shalom et al. ............................. 379/76 |
| 4,996,704 | 2/1991 | Brunson .................................... 379/67 |
| 5,016,273 | 5/1991 | Hoff . |
| 5,027,384 | 6/1991 | Morganstein ............................. 379/67 |
| 5,029,198 | 7/1991 | Walpole et al. ........................... 379/88 |
| 5,109,414 | 4/1992 | Harvey et al. ............................. 380/9 |
| 5,247,549 | 9/1993 | Snowden et al. ...................... 370/94.1 |
| 5,247,568 | 9/1993 | Bergsman et al. ........................ 379/67 |
| 5,293,484 | 3/1994 | Dabbs, III et al. ..................... 395/164 |
| 5,337,044 | 8/1994 | Folger et al. ....................... 340/825.44 |
| 5,381,138 | 1/1995 | Stair et al. .......................... 340/825.44 |
| 5,418,527 | 5/1995 | Yashiro ............................... 340/825.24 |
| 5,434,906 | 2/1995 | Robinson et al. ........................ 379/67 |
| 5,434,908 | 7/1995 | Klein ........................................ 379/88 |
| 5,434,910 | 7/1995 | Johnson et al. ........................... 379/89 |
| 5,459,458 | 10/1995 | Richardson et al. ............... 340/825.52 |
| 5,461,665 | 10/1995 | Shur et al. ................................ 379/67 |
| 5,594,658 | 1/1997 | Lemaire et al. ..................... 364/514 B |
| 5,635,923 | 6/1997 | Steele et al. ............................ 340/905 |
| 5,664,948 | 9/1997 | Dimitriadis et al. ................ 434/307 R |

*Primary Examiner*—Scott Weaver
*Attorney, Agent, or Firm*—Roylance, Abrams, Berdo & Goodman, L.L.P.

[57] ABSTRACT

A remotely programmable message delivery system comprises a number of client computers which communicate with a server to send control signals to one or more remote message playback devices. The message playback devices are each provided with a library of messages, and comprise at least one music on-hold-compatible telephone system, a public address system or other audio and/or visual advertising device. Message playlists from the client computers can be sent via the server to the message playback devices by a communication link such as a radiopaging system. The client computer is programmed to generate screens for guiding an operator to select messages from the library of messages and the order and times at which they are to be played by selected message playback devices. Message playback devices can be organized into one or more regions to allow a message playlist to be sent to more than one message playback device using a single radiopaging signal. The client computer can also generate screens to display the text of selected messages.

36 Claims, 27 Drawing Sheets

| Field | Type | Description |
|---|---|---|
| ACCOUNT | Long | Customer account number |
| ESN | Long | Electronic serial number |
| MANDATE | Date | Date of manufacture |
| REGION | Text | Region |
| BMN1 | Long | Auxiliary BMN #1 |
| BMN2 | Long | Auxiliary BMN #2 |
| BMN3 | Long | Auxiliary BMN #3 |
| MODEL | Text | Model number |
| FIRMREV | Text | Firmware revision |
| FIRMNUM | Text | Firmware ID number |
| CNFGDATE | Date | Date of last configuration programming |
| STATDATE | Date | Date of last status read |
| ZERODATE | Date | Date of last statistics clear |
| PAGECNT | Long | Total page count |
| PAGEERR | Long | Total corrupted page count |
| PAGESNT | Long | Total transmitted page count |
| CNFGPEND | Byte | 'C' for configuration pending, 'R' for region change pending |

*FIG. 5*

| Field | Type | Description |
|---|---|---|
| PORT | Byte | Port number |
| FUNC | Byte | Port function |
| ENAB | Byte | 1=Port enabled |
| CHANGE | Date | Date of last change |

*FIG. 6*

| Field | Type | Description |
|---|---|---|
| ACCOUNT | Long | Customer account number |
| PW1 | Text | Current access password |
| PW2 | Text | Previous access password |
| CUSTNAME | Text | Customer name |
| ADDRESS1 | Text | Address line 1 |
| ADDRESS2 | Text | Address line 2 |
| CITY | Text | City |
| STATE | Text | State |
| ZIP | Text | Zip or other mailing code |
| PHONE | Text | Telephone number |
| FAX | Text | FAX number |
| CONTACT | Text | Contact name |
| SALESREP | Text | Sales representative name |
| MAKEDATE | Date | Record creation date |
| EDITDATE | Date | Record last edit date |

*FIG. 7*

| Field | Type | Description |
|---|---|---|
| ACCOUNT | Long | Customer account number |
| REGION | Text | Region name |
| KEY | Long | Region key |
| SSTATE | Integer | Record status |
| BMN | Long | Broadcast method number |
| RN | Integer | Region number |
| DESCRIP | Text | Description of region |
| MAKEDATE | Date | Record creation date |
| EDITDATE | Date | Record last edit date |

*FIG. 9*

| Field | Type | Description |
| --- | --- | --- |
| ACCOUNT | Long | Customer account number |
| SITE | Text | Site name |
| KEY | Long | Site key |
| SSTATE | Integer | Synchronization |
| ESN | Long | CDPC electronic serial number |
| MANAGER | Text | Site manager |
| REGKEY | Long | Current region (by Key) |
| NREGKEY | Long | Newly selected region (by Key) |
| ADDRESS1 | Text | Address line 1 |
| ADDRESS2 | Text | Address line 2 |
| CITY | Text | City |
| STATE | Text | State code |
| ZIP | Text | Zip code |
| PHONE | Text | Telephone number |
| FAX | Text | FAX number |
| COUNTRY | Text | Country |
| HOURS | Text | Hours of operation |
| NOTES | Text | Notes |
| MAKEDATE | Date | Record creation date |
| EDITDATE | Date | Record last edit date |

*FIG. 8*

| State | Value | Description |
|---|---|---|
| ssNew | 0 | The Client record has been created, but it has not yet been forwarded to the Server. |
| ssPend | 1 | The Client record has been forwarded to the Server, but is still awaiting transmission. |
| ssSync | 2 | The Server record and the Client record are up-to-date. |
| ssMod | 3 | The Client record has been changed, but the changes have not yet been forwarded to the Server. |
| ssReady | 4 | The Server record has been processed, but the Client has not yet been notified. |
| ssDel | 5 | The record has been deleted by the Client and requires administrative attention. |

*FIG. 10*

| Field | Type | Length | Description |
|---|---|---|---|
| ACCOUNT | Long | | Customer account number |
| MCODE | Long | | Message Code |
| TITLE | Text | 32 | Descriptive title of message |
| SIG | Boolean | | TRUE for a signature track |
| TRAK | Integer | | Uncorrected track assignment |
| LIBDISC | Integer | | Library CD number |
| LIBTRAK | Integer | | Library track number |
| READER | Text | 16 | Reader code, MALE, FEMALE, etc. |
| COPY | Memo | | Message copy |
| INTROTIME | Integer | | Introduction time (seconds) |
| READTIME | Integer | | Reading time (seconds) |
| TRAILTIME | Integer | | Trailer time (seconds) |
| RECDATE | Date | | Date message was recorded |
| SSTATE | Integer | | Synchronization status |

*FIG. 11*

| Field | Type | Description |
|---|---|---|
| ACCOUNT | Long | Customer account number |
| SITEKEY | Long | Site name |
| MCODE | Long | Message code |
| TRAK | Integer | Corrected track number |

*FIG. 12*

| Status | Meaning |
|---|---|
| ssNew | The message record has been entered into the Server database and needs to be sent to the Client. |
| ssPend | The message record has been downloaded to the user for approval. |
| ssSync | The message has been approved by the Customer. |
| ssMod | The message record has been changed in the Server database and needs to be re-sent to the Client. |
| ssReady | The message record has been approved in the Client database, but the Server needs to be notified. |

*FIG. 13*

| Field | Type | Description |
|---|---|---|
| BMN | Long | Broadcast method number |
| CARKEY | Text | Carrier key |
| PIN | Text | PIN number |
| CAPCODE | Long | Capcode |
| FORMAT | Byte | Format code |
| FREQ | Long | Frequency (Hz) |
| BW | Long | Bandwidth (Hz) |
| COVERAGE | Text | Coverage region |

*FIG. 14*

| Field | Type | Description |
|---|---|---|
| CARRIER | Text | Carrier name |
| KEY | Long | Carrier key |
| INPUTFMT | Byte | Input format code |
| ADDRESS | Text | Phone number or TCP/IP address |
| MODINIT | Text | Modem initialization string |
| RESPONSE | Text | ixo/TAP response |
| PKTSIZE | Integer | Maximum packet size |

*FIG. 15*

| Field | Type | Description |
|---|---|---|
| ACCOUNT | Long | Customer account number |
| SEQ | Long | Playlist sequence number |
| LIST | Text | Playlist name |
| URGENT | Byte | Urgent flag |
| SENDDATE | Date | Date to send command |
| MAKEDATE | Date | Creation date |
| EDITDATE | Date | Last modified date |
| SENDDATE | Date | Scheduled transmission date |
| SSTATE | Byte | Synchronization status |

*FIG. 16*

| Field | Type | Description |
|---|---|---|
| ACCOUNT | Long | Customer account number |
| SEQ | Long | Command sequence number |
| POS | Byte | Relative position in Playlist |
| MCODE | Long | Message code |

*FIG. 17*

| Field | Type | Description |
|---|---|---|
| ACCOUNT | Long | Customer account number |
| SEQ | Long | Command sequence ID |
| SITEKEY | Long | Site key |
| SENT | Boolean | Sent flag |

Message Viewer

| | | | |
|---|---|---|---|
| Message | A1 | Title | Overdraft Protection |
| Reader | Male | Intro Time | :4 |

Copy: Add extra protection to your Bank One checking account. Our overdraft protection service is a special line of credit linked to your checking account that automatically covers "bounced checks." Payment can be automatic, too! We'll deduct a minimum amount monthly from your checking account, or you can repay the entire amount. Ask us for details when we return to the line.

Read Time: :18    (:22) Music Up and Out (:27)

[Next]  [Prev]  [Close]

Message Viewer

| | | | |
|---|---|---|---|
| Message | A2 | Title | The Bright Side |
| Reader | Male | Intro Time | :4 |

Copy: Three...Two...One...Zero! Zero in on Value One Checking at Bank One and save on monthly service fees. So, start today with zero minimum checking account balance requirements, zero check writing fees, and zero transaction fees. Ask for details when we come back on the line.

Read Time: :18    (:22) Music Up and Out (:27)

[Play]  [Next]  [Prev]  [Add]  [Close]

| Edit Site | | | |
|---|---|---|---|
| Site | Forest Park | Created | 3/12/96 |
| Status | Newly created | Last Edited | 3/12/96 |

General | Playlist | Pending

General Information

| | | | |
|---|---|---|---|
| Contact | | Manager | |
| Address 1 | | | |
| Address 2 | | | |
| City | | State | Zip |
| Country | | | |
| Phone | | FAX | |
| Notes | | | |

Save | Cancel

| Edit Site | | | | |
|---|---|---|---|---|
| Site | MtOrab | Created | 3/12/96 | |
| Status | Newly created | Last Edited | 3/12/96 | 146 |
| | General   Playlist   Pending | | | |

Current Playlist

| Messages in Current Playlist |
|---|
| A1   Overdraft Protection |
| A2   The Bright Side |
| A4   In The Shade |

FIG. 27

| Edit Site | | | | |
|---|---|---|---|---|
| Site | Forest Park | | Created | 3/12/96 |
| Status | Newly created | | Last Edited | 3/12/96 |

General | Playlist | Pending

Pending Playlists and Reg[Current Message Play List]

Region
Current: Cincinnati    Pending: Cincinnati ▽

Pending Playlist Register

| Send Date | Playlist | △ |
|---|---|---|
|  |  |  |
|  |  | ▽ |

[Save]                                    Cancel

*FIG. 28*

| | Field | Definition |
|---|---|---|
| 0 | START | Sequence number |
| 1 | LEN | Length of packet (SEQ through SUM inclusive) |
| 3 | SEQ | Packet sequence |
| 4 | DATA | Message-specific data |

| | | |
|---|---|---|
| 2+LEN | CRC | CRC-16 |

*FIG. 30*

| Field | Definition |
|---|---|
| ACCOUNT | Account number |
| PASS | Password |
| NEWPASS | New Password (optional) |

*FIG. 31*

| Field | Definition |
|---|---|
| SITEKEY | 1st Site Key |
| ⋮ | |
| SITEKEY | Last Site Key |

*FIG. 32*

| Field | Definition |
|---|---|
| REGNKEY | 1st Region Key |
| ... | ... |
| REGNKEY | Last Region Key |

*FIG. 33*

| Field | Definition |
|---|---|
| LISTKEY | 1st Playlist Key |
| ... | ... |
| LISTKEY | Last Playlist Key |

*FIG. 34*

| Field | Definition |
|---|---|
| REGION | Region name |
| KEY | Region key |
| DESCRIP | Description |
| EDITDATE | ACCOUNT |

*FIG. 36*

| Field | Definition |
|---|---|
| SITE | Site name |
| KEY | Site key |
| SSTATE | Synchronization |
| MANAGER | Site manager |
| NREGKEY | Newly selected region (by Key) |
| ADDRESS1 | Address line 1 |
| ADDRESS2 | Address line 2 |
| CITY | City |
| STATE | State code |
| ZIP | Zip code |
| PHONE | Telephone number |
| FAX | FAX number |
| COUNTRY | Country |
| HOURS | Hours of operation |
| EDITDATE | Date of last change by user |

*FIG. 35*

| Field | Definition |
|---|---|
| LIST | Playlist name |
| SEQ | Playlist sequence |
| URGENT | Urgent flag |
| SITEKEY | 1st Site key in Playlist |
| ⋮ | |
| SITEKEY | Last Site key in Playlist |
| SEP1 | End of Site list |
| MCODE | 1st Message code in Playlist |
| ⋮ | |
| MCODE | Last Message code in Playlist |

*FIG. 37*

| Field | Definition |
|---|---|
| KEY | Site Key |
| SSTATE | Synchronization |

*FIG. 38*

| Field | Definition |
|---|---|
| KEY | Region Key |
| SSTATE | Synchronization state |

*FIG. 39*

| Field | Definition |
|---|---|
| LIST | Playlist name |
| SEQ | Playlist sequence |
| URGENT | Urgent flag |
| SENT | Transmitted flag |
| SSTATE | Synchronization state |
| SITEKEY | 1st Site key in Playlist |

| | |
|---|---|
| SITEKEY | Last Site key in Playlist |
| SEP1 | End of Site list |
| MCODE | 1st Message code in Playlist |

| | |
|---|---|
| MCODE | Last Message code in Playlist |

*FIG. 40*

| | Field | Definition |
|---|---|---|
| 0 | FUNC | Packet function (30h) |
| 1 | REGMASK | Region mask |
| 3 | TRACK(0) | First track number |
| 4 | TRACK(1) | Second track number | n times

| | | |
|---|---|---|
| 3+n | TRACK(n-1) | Last track number |

*FIG. 44*

| | Field | Definition |
|---|---|---|
| 0 | FUNC | Packet function (31h) |
| 1 | ESN | Electronic serial number |
| 3 | TRKCNT | Number of tracks (n) |
| 4 | TRACK(0) | First track number |
| | TRACK(1) | Second track number | n times

| | | |
|---|---|---|
| 4+n | TRACK(n-1) | Last track number |

*FIG. 45*

| | Field | Definition |
|---|---|---|
| 0 | FUNC | Packet function (50h) |
| 1 | ESN | Electronic serial number |

*FIG. 46*

|   | Field | Definition |
|---|---|---|
| 0 | FUNC | Packet function (51h) |
| 1 | CAPCODE | Capcode #1 value |

|   | Field | Definition |
|---|---|---|
| 0 | FUNC | Packet function (54h) |
| 1 | CAPCODE | Capcode #2 value |

|   | Field | Definition |
|---|---|---|
| 0 | FUNC | Packet function (53h) |
| 1 | CAPCODE | Capcode #3 value |

|   | Field | Definition |
|---|---|---|
| 0 | FUNC | Packet function (54h) |
| 1 | CAPCODE | Capcode #4 value |

*FIG. 47*

|   | Field | Definition |
|---|---|---|
| 0 | FUNC | Packet function (56h) |
| 1 | REGNUM | Region number |

*FIG. 48*

|   | Field | Definition |
|---|---|---|
| 0 | RESP | Packet response (00h) |

*FIG. 49*

|   | Field | Definition |
|---|---|---|
| 0 | RESP | Packet response (02h) |

*FIG. 50*

|   | Field | Definition |
|---|---|---|
| 0 | RESP | Packet response (02h) |

*FIG. 51*

|   | Field | Definition |
|---|---|---|
| 0 | RESP | Packet function (30h) |
| 1 | ESN | Electronic serial number |
|   | CAPCODE1 | Primary Capcode |
|   | CAPCODE2 | Secondary Capcode |
|   | CAPCODE3 | Secondary Capcode |
|   | CAPCODE4 | Secondary Capcode |
|   | FORMAT | Paging format |
|   | GROUPNUM | Group number |
|   | CDPTYPE | CD Player ID |
|   | TRACKCNT | Number of tracks in track list |
| 3 | TRACK(0) | 1st Track Number |
| 4 | TRACK(1) | 2nd Track Number |
|   | ⋮ n times |   |
| 3+n | TRACK(n−1) | Last Track Number |

*FIG. 52*

PROGRAMMABLE MESSAGING SYSTEM FOR CONTROLLING PLAYBACK OF MESSAGES ON REMOTE MUSIC ON-HOLD-COMPATIBLE TELEPHONE SYSTEMS AND OTHER MESSAGE OUTPUT DEVICES

FIELD OF THE INVENTION

The invention relates to a system for generating and transmitting message playlists to remotely located optical disc players for playing selected messages via a music on-hold-compatible telephone system or public address system.

BACKGROUND OF THE INVENTION

Many businesses use music on-hold-compatible (MOH) telephone systems to provide a customer with music or audio promotions of products or services while the customer is placed on-hold and waiting for assistance. A number of existing MOH telephone systems use tape players as the audio source. The promotional messages are recorded on endless loop cassette tapes. These systems are disadvantageous because the tapes are subject to wear, and the tape players are prone to mechanical malfunctioning. Messages are not modified (i.e., adding or deleting individual messages from a message playlist or modifying the sequence for playing messages on the playlist) because an individual message track cannot be accessed without first winding the tape forward or backward, respectively, past the succeeding or preceding message tracks. Thus, tapes requiring modification are usually discarded, and a new tape is purchased and recorded with messages in accordance with a new message playlist.

Another type of existing MOH telephone system eliminates the use of a tape player by downloading digitized audio messages onto an integrated circuit (IC) chip. The stored messages are played in a particular sequence that is repeated. While the number of moving parts that are subject to mechanical failure is reduced, the system is nonetheless disadvantageous because it is does not allow a user to program when an individual message is to be played or to add or delete a message from a playlist or modify the sequence with which the stored messages are played.

An improved MOH telephone messaging system is disclosed in U.S. patent application Ser. No. 07/999,592, filed Dec. 31, 1992, for ON-HOLD MESSAGING SYSTEM AND METHOD, the entire subject matter of which is hereby incorporated herein by reference for all purposes. The improved MOH telephone messaging system uses at least one optical disc player, such as a compact disc player (CDP), as the audio source. A CDP delivers improved sound quality and offers the ability to add or delete individual messages from a playlist and to change the play sequence of messages stored on an optical disc. For example, the CDP can be programmed to not play one or more of the stored messages at all. Thus, a message playlist can be altered without purchasing and recording a new message storage medium, unlike audio sources which use a cassette tape or an IC. The disclosed CDP-based telephone messaging system, however, is not remotely programmable.

SUMMARY OF THE INVENTION

In accordance with an aspect of the present invention, a remotely programmable message delivery system is provided which allows users to specify message sequences that are to be played at one or more remote sites via an MOH telephone system or other advertising device such as a public address system. The message delivery system comprises a communication link and a plurality of message playback devices, each of the message playback devices comprising a storage device for storing a plurality of audio messages. A computer remotely located from the plurality of message playback devices transmits control signals via the communication link for controlling at least one of the plurality of message playback devices. Each of the plurality of message playback devices is adapted to receive the control signals via the communication link. The computer is programmable to generate screens for guiding an operator to make choices selected from the group consisting of: which of the audio messages is to be played, which of the plurality of message playback devices is to play the selected audio message(s), which of a number of subsets of the plurality of message playback devices is to play the selected audio message(s), and the order in which multiple selected audio messages are to be played, and to generate control signals to implement these choices.

In accordance with another aspect of the present invention, the computer generates a screen displaying a location directory and a message directory. A user can select messages from the message directory for play at different remote sites selected from the location directory, as well as specify the sequence in which the selected messages are to be played at each selected remote site.

In accordance with yet another aspect of the present invention, the computer generates a location directory comprising the names of regions and the names of remote sites located in each of the regions. The computer is programmable to allow a user to add and delete remote site names in the location directory, as well as to create, modify and delete regions. The computer can generate a single command for a number of message playback devices located in the same region to play the same message playlist.

In accordance with still another aspect of the present invention, the computer is programmable to generate a screen which allows a user to select a message from the message directory and to display a full text script of the message.

In accordance with still another aspect of the present invention, the computer is programmable to generate control signals and provide them to a radiopaging company for transmission to the remote sites via radiopaging signals.

In accordance with still another aspect of the present invention, the system comprises a plurality of computers configured as client computers, and a central computer with which all of the client computers communicate via a communication link. The central computer receives data from the client computers relating to user choices for message playlists at selected remote sites and transmits the data to the remote sites via the same or another communication link. The central computer can communicate with a radiopaging company to transmit the data via radiopaging signals.

In accordance with still another aspect of the present invention, the message playback devices each comprise a compact disc player and a receiver circuit for receiving radiopaging signals transmitted by via a radiopaging company. The receiver circuit recognizes radiopaging signals directed to it and commands the compact disc player to play the message tracks specified in the radiopaging signals at the time and in the sequence requested by the client computer from which the message playlist data for the radiopaging signals originated.

BRIEF DESCRIPTION OF THE DRAWINGS

These and other features and advantages of the present invention will be more readily apprehended from the following detailed description when read in connection with the appended drawings, which form a part of this original disclosure, and wherein:

FIG. 5, 6, 7, 8, 9, 10, 11, 12, 13, 14, 15, 16, 17 and 18 are tables for storing data in a distributed database constructed in accordance with an embodiment of the present invention;

FIGS. 19, 20, 21, 22, 23, 24, 25, 26, 27 and 28 are screens generated by a client computer for guiding a client to enter message playlist data in accordance with an embodiment of the present invention;

FIG. 30 depicts the format of a packet transmitted between a client computer and a server in accordance with an embodiment of the present invention;

FIG. 31, 32, 33, 34, 35, 36, 37, 38, 39 and 40 illustrate fields in different packets transmitted between a server and a client computer in accordance with an embodiment of the present invention;

FIGS. 43, 44, 45, 46, 47, 48, 49, 50, 51 and 52 illustrate fields in packets transmitted between a server and a message playback device in accordance with an embodiment of the present invention.

DETAILED DESCRIPTION OF THE PREFERRED EMBODIMENTS

Figure 1:
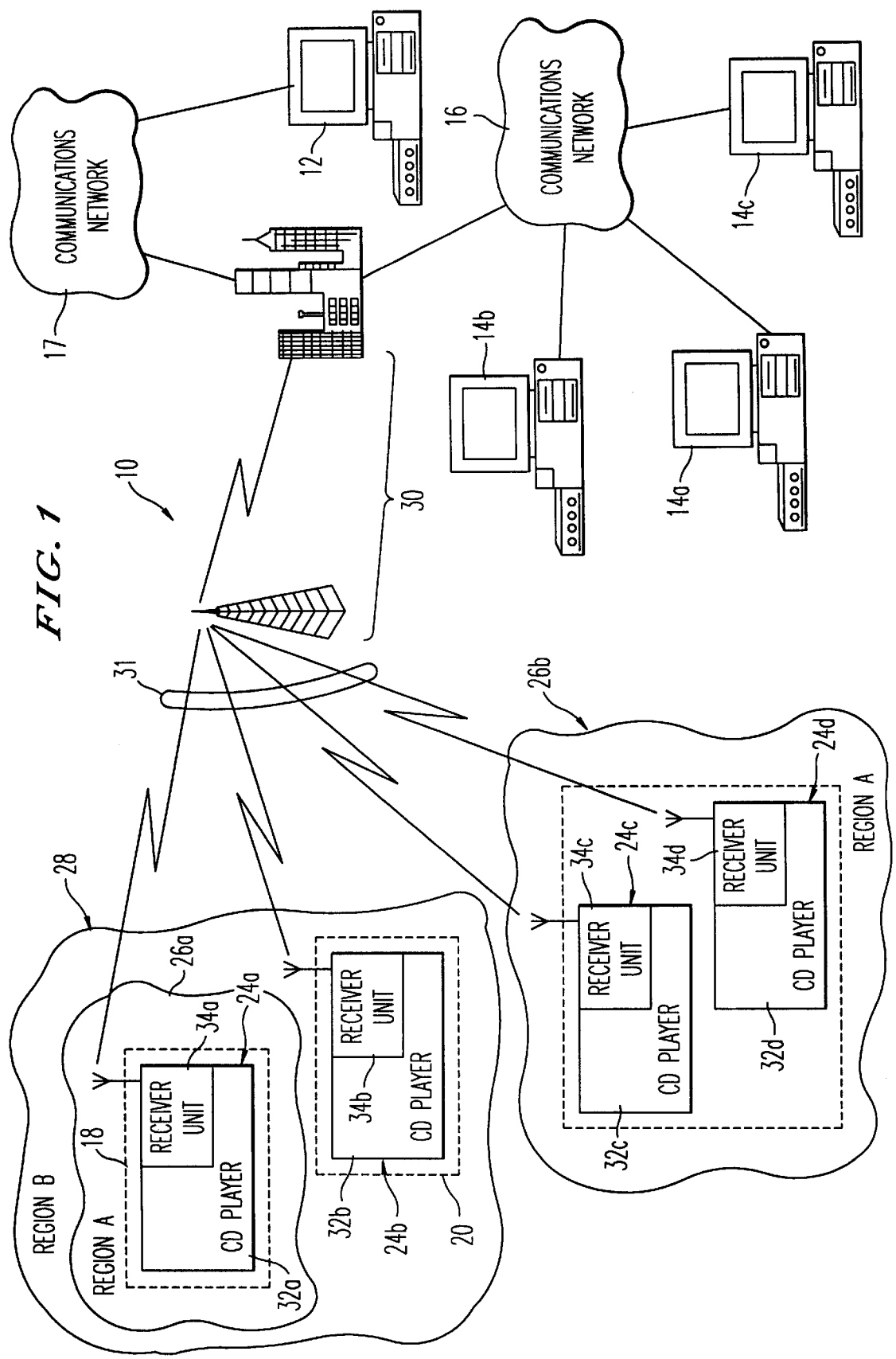
FIG. 1 is a schematic block diagram of a remotely programmable messaging system constructed in accordance with an embodiment of the present invention.

FIG. 1 depicts a message delivery system 10 for remotely controlling the playback of messages at a number of remote sites via message playback devices. The term "message" used herein refers to music, advertisements or other recorded audio signals which can be played for a person whose telephone call has been answered by a MOH telephone system. In addition, the system 10 can be configured to program remote, multimedia message playback devices, in which case a message can comprise video or other data, as well. The system 10 comprises at least one central administrative computer 12 hereinafter referred to as a server. The server 12 receives message playback data, including sequences of selected messages (hereinafter referred to as playlists) that originate from a number of client computers 14a and 14b, and uses the message playback data to command message playback devices 24 at selected remote sites to play selected messages. Thus, message playback data can comprise identification of selected remote sites at which the messages are to be played, as well as other data such as effective dates for playlists (i.e., the dates on which the server 12 actually transmits the playlists to the message playback devices). Two computers 14a and 14b are shown for illustrative purposes, although more client computers can be used in the system 10. The system 10 can comprise more than one server 12, for example, if the amount of data received from the computers 14 exceeds the processing capability of a single server 12. The server 12 and the client computers 14 are preferably IBM-compatible personal computers (PCs), although other platforms such as UNIX and Macintosh can be used. The computers 14 are adapted to communicate with the server 12 via a communication network 16 such as a public switched telephone network (PSTN). The network can also be a private network with a private branch exchange (PBX), a radiopaging network, an optical fiber network, a microwave network, a satellite network, and the like.

The computers 14 are used by clients to enter information relating to the generation of messages at one or more remote sites. As shown in FIG. 1, three remote sites 18, 20 and 22 are each provided with one or more message playback devices 24a, 24b, 24c and 24d, respectively. For example, a first client can be a bank which uses the computer 14a to send message playlists and other information to bank branches located at sites 18 and 20, respectively. A second client can be a product distributor which uses the computer 14b to send message playlists to a regional office at site 22. The system 10 allows a client to define regions such as regions A and B indicated at 26 and 28, respectively. Region A 26 is shown as a region consisting of noncontiguous geographical areas 26a and 26b for illustrative purposes. Thus, a message playlist can be sent to message playback devices 24a, 24c and 24d at sites 18 and 22 if region A 26 is specified, or to message playback devices 24a and 24b at sites 18 and 20 if region B 28 is specified. The ability to define regions is advantageous because multiple sites with similar programming requirements (e.g., sites in the same geographical area or sites performing the same customer service function) can be programmed by specifying a single playlist at one of the computers 14.

Figure 2:
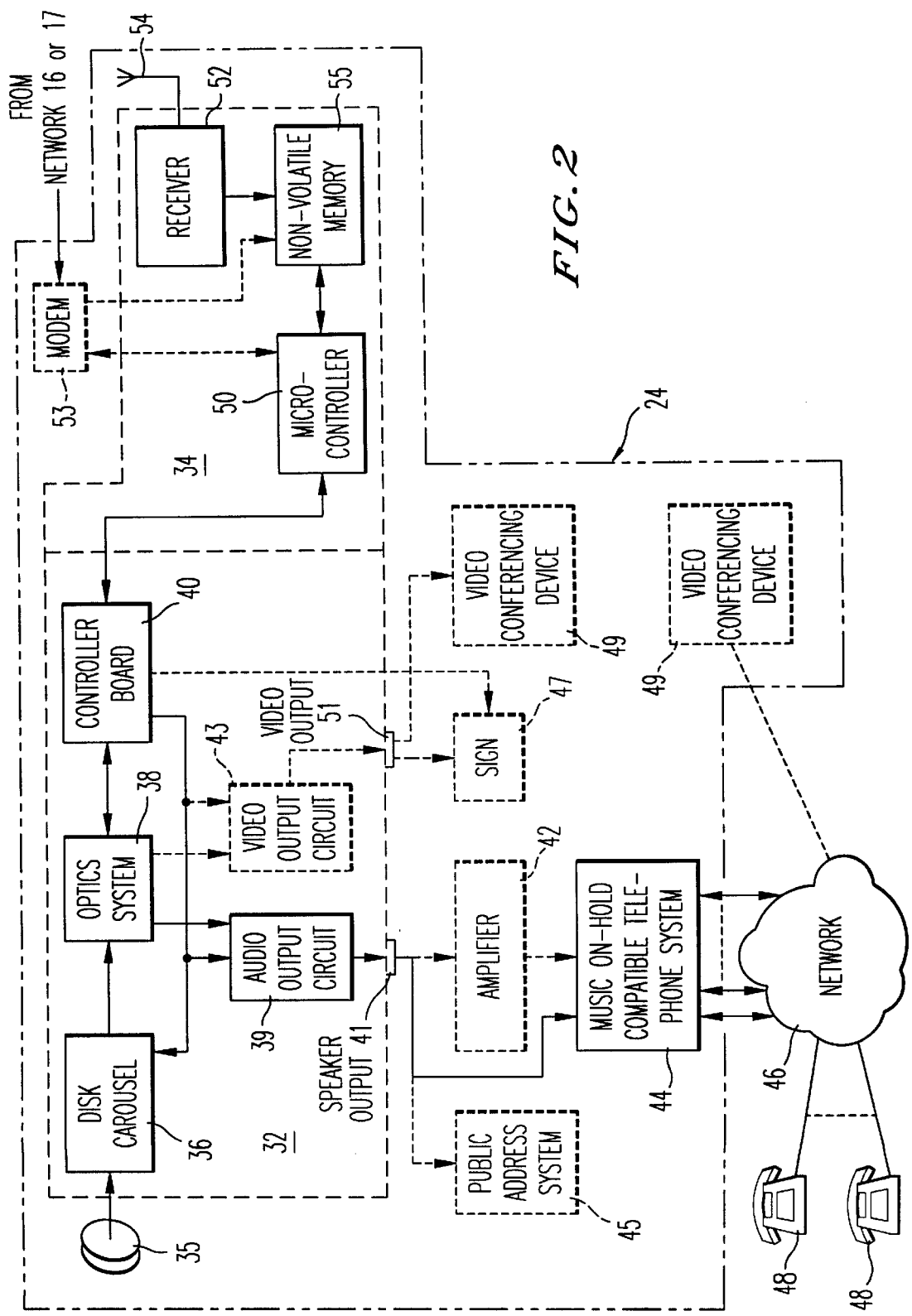
FIG. 2 is a schematic block diagram of a message playback device constructed in accordance with an embodiment of the present invention and connected to a conventional MOH telephone system.

As shown in FIG. 2, each message playback device 24 is preferably provided with a compact disc (CD) or discs 35 on which messages have been recorded. Messages, however, can also be stored and distributed on other storage media such as an integrated circuit or a magnetic disk. Accordingly, the message playback devices 24 can be configured in accordance with the present invention to access different types of storage media and discrete, individual messages stored thereon. Businesses and other concerns employing the system 10 request certain messages which are recorded and then written to optical discs. The optical discs are then distributed to each remote site associated with these businesses and installed at each corresponding message playback device 24. The frequency with which the discs are distributed can vary, depending on the needs of the businesses to update message data. The discs for a business are preferably identical at each message playback device 24.

The discs can comprise several related messages, which differ only by reference to a different season or recurring event or interest rate, for example. Users can therefore select the appropriate message(s) when necessary and thereby reduce the frequency of updating the discs with new messages and then distributing them. For example, a manager for a chain of five retail stores can program message playback devices at each of the stores to alternately play messages C1 and C2, which correspond to announcements for everyday discount prices at 10% off list price and regular store hours and locations, respectively. During a sale, the manager can change the playlist to include messages C1 and C3, that is, a message announcing 30% savings during the sale event. At the end of a calendar year, the manager can modify the playlist to include messages C3 and C4 corresponding to announcements for extended business hours and 50% savings. Messages C1, C2, C3 and C4 can all be recorded onto the CDs 35 in advance and programmed for play as needed. When a user (e.g., the manager) creates a playlist, the client computer 14 is programmed to prompt the user to specify an effective date, that is, the date after which the server 12 can transmit a command to play the messages on the playlist to the intended remote sites. Thus, a user can modify a playlist (e.g., replace a message on a playlist with another message from a CD 35) in advance of the actual date after which the other message is intended to be played at a remote site (e.g., in advance of a sale date).

The computers 14 transmit the message playlists and other information pertaining to selected remote sites 18, 20 or 22 to the server 12. The playlists comprise, for example, the identification codes (e.g., C1, C2, and so on) of selected messages on the CDs that a business wishes to have played, the sequence with which the selected messages are to be played, and the remote sites for which a playlist is intended. The identification codes are preferably alphanumeric codes. The server 12, in turn, generates control signals for the message playback devices at the selected remote sites to play the selected messages. In accordance with the present invention, the server 12 converts message identification codes from playlists received from the computers 14 into corresponding track numbers on the CDs which are incorporated into the control signals. For example, the server 12 determines a track number corresponding to a message on a playlist by consulting a track legend stored in a memory device 74 of FIG. 4 (e.g., tables 94 and 96 described below in connection with FIGS. 11 and 12). The track legend stores the track numbers on the disc(s) 35 and the unique identification codes corresponding to respective messages. The track numbers of a particular message can vary among the CDs at the different remote sites.

The server 12 preferably transmits control signals comprising playlists to a subcarrier radiopaging company 30 for radiopaging the remote message playback devices 24 via a communication link 31. Other types of communication links 31, however, can be used such as a satellite communication link, a microwave link, a PSTN, an optical fiber network or other communications link. Further, the server 12 can communicate with the radiopaging company 30 via the communication link 16 or another communication link 17.

With reference to FIG. 2, each message playback device 24 preferably comprises an optical disc player 32 (e.g., a CDP), and a receiver circuit 34 which is adapted to process control signals transmitted via the communication link 31 into command signals for the optical disc player 32. The optical disc player preferably comprises a speaker output or other output 41 which is connected to at least one advertising device such as a MOH telephone system 44, a public address system 45, and a visual display device (e.g., an electronic sign) 47. The receiver circuit 34 can be implemented on a circuit board (not shown) mounted inside the chassis of a commercially available optical disc player. The optical disc player 32 can be, for example, a Model CDP-297 compact disc player available from Sony Corporation of America, Park Ridge, N.J. The optical disc player 32 comprises a disc carousel 36, cartridge or retractable shelf adapted to receive one or more optical discs 35, an optics system 38 for reading data from an optical disc, an audio output circuit 39 for generating audio signals from signals received from the optics system 38 and providing the audio signals to a speaker output 41, and a controller 40 for controlling the CDP components 36, 38 and 39.

As stated previously, the optical disc player 32 can be connected to a conventional MOH telephone system 44 having on-hold messaging capabilities such as the Merlin System Model 1030 manufactured by AT&T, Parsippany, N.J., or the Electra Mark II Series telephone system with Model TSW-E circuit card manufactured by NEC America, Melville, N.Y. It is to be understood, however, that the telephone system 44 can also be a PBX or other type of telephone system such as an automated telephone answering system. An optional audio amplifier 42 (e.g., a Model 1701 amplifier manufactured by University Sound, Inc., Sylmar, Calif.) can be connected between the optical disc player 32 and the MOH telephone system 44, if their respective output signal levels are different, to improve the volume level and clarity of the audio signals heard by callers accessing the MOH telephone system 44 via a communications network 46 and telephones 48 or other telecommunications access devices. The network 46 of FIG. 2 and the network 16 of FIG. 1 are preferably the same PSTN.

With continued reference to FIG. 2, the receiver circuit 34 preferably comprises a microcontroller 50 programmed in accordance with the present invention, a receiver 52 and an antenna 54. The receiver 52 is adapted to demodulate signals (e.g. radiopaging signals) received from the communications link between the server 12 and the message playback devices 24 (e.g., via the radiopaging company 30). The demodulated signals are preferably stored in a non-volatile memory device 55. The microcontroller 50 decodes the stored signals and converts them into command signals for the controller 40. The controller 40, in turn, controls the optical disc player 32 to queue up tracks corresponding to selected messages in the playlist for playing. In accordance with another embodiment of the invention, the system 10 can be configured with a single computer 14 and no server 12. For example, the computer 14 can be located in an office within a building and connected directly to one or more message playback devices 32 in the building such as a public address system 45 and a number of signs 47 via a wireline communications link (e.g., a local area network) and modem 53.

While the system 10 is described for use with a MOH telephone system 44 to accommodate customers awaiting assistance via telephones 48, the system 10 can be adapted to provide remote programmability for other types of audio and multimedia message delivery equipment such as a programmable public address system 45, an electronic sign 47 or a videoconferencing device 49. The optical disc player 32 can be configured as a multimedia device having a video output device 49 for processing data accessed from the CD(s) 35. For example, messages can include video commercials for a videoconferencing device 49 at a remote site having a corresponding audio message on the speaker output 41, or a still picture (e.g., a picture of a client's business premises) that is useful with different audio messages. The videoconferencing device can receive multimedia messages directly from the multimedia optical disc player 32 or from the MOH telephone system 44.

Thus, in accordance with the present invention, each message playback device 24 at the remote sites 18, 20 and 22 can be programmed by users operating at least one of the computers 14a and 14b to play messages stored on optical disc(s) 35 on a MOH telephone system 44 or other advertising device having a speaker or display device. Further, the system 10 simplifies the process of selecting message playlists and allows a system user to more effectively maintain a promotional program for customers placed on-hold, or in the broadcast area of a public address system, in view of a programmable display or operating a multimedia computer.

Figure 3:
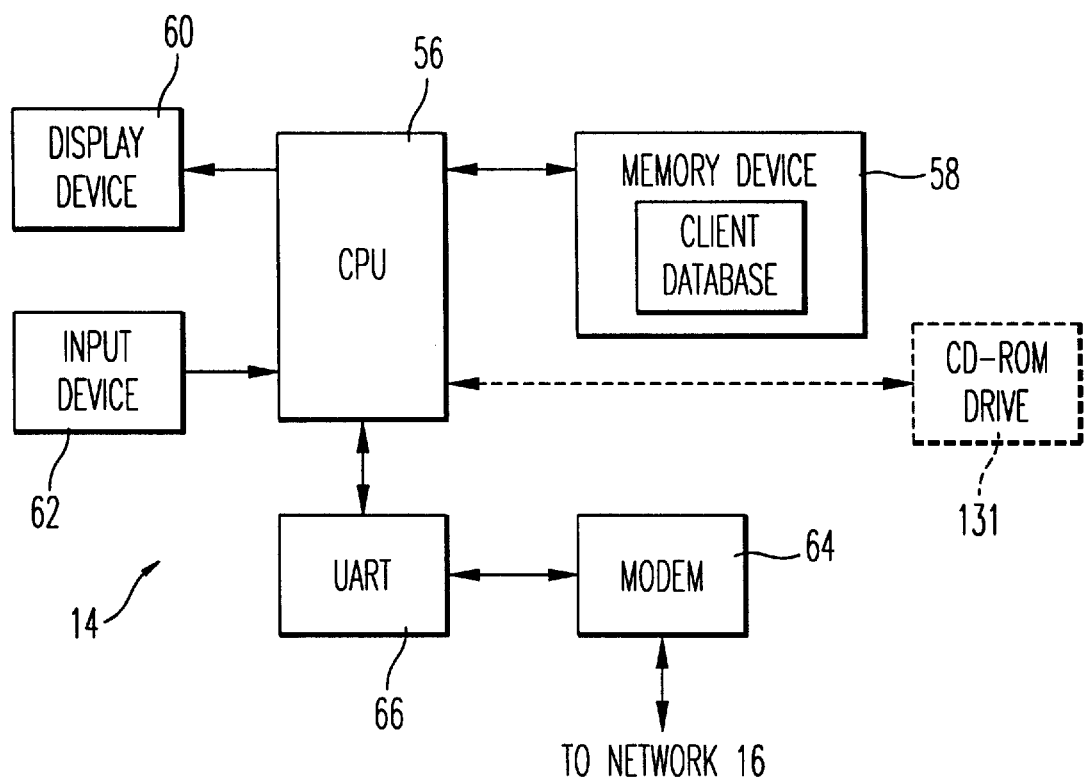
FIG. 3 is a schematic block diagram of a client computer constructed in accordance with an embodiment of the present invention.
Figure 4:
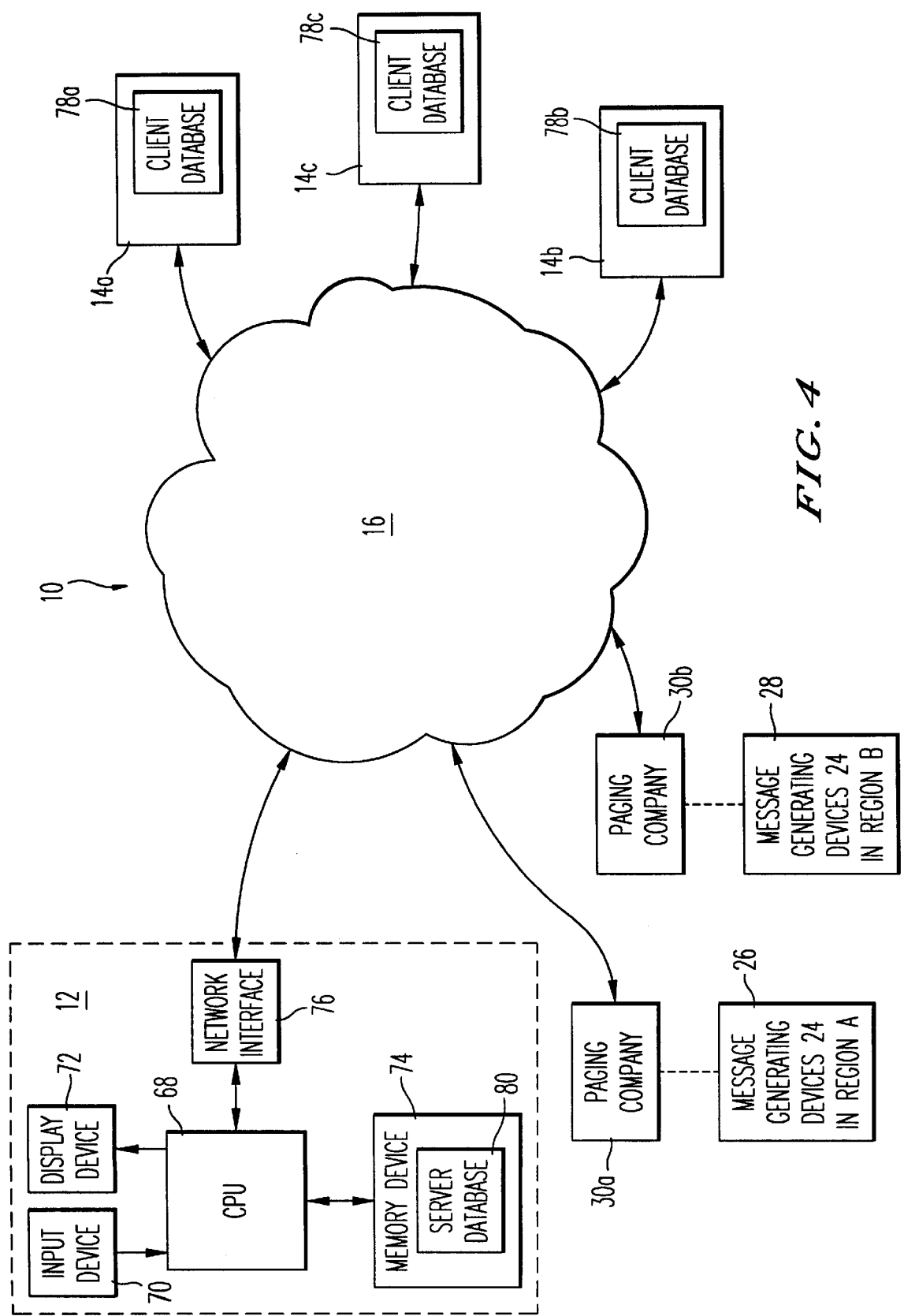
FIG. 4 is a schematic block diagram of a server in a remotely programmable messaging system constructed in accordance with an embodiment of the present invention.

With reference to FIG. 3, each client computer 14 comprises a central processing unit (CPU) 56 (e.g., a microcontroller), a memory device 58, a display device 60 such as a video monitor, and at least one input device 62 such as a keyboard and preferably also a mouse. The computer 14 communicates with the server 12 in a manner described below via a modem 64 and a universal asynchronous receiver/transmitter 66. Similarly, as shown in FIG. 4, the server 12 comprises a CPU 68, an input device 70, a display device 72, and a memory device 74. The server 12 comprises a network interface 76 to communicate with other devices via the network 16. The server 12 is depicted in FIG. 4 as being connected via PSTN 16 to client computers 14*a*, 14*b* and 14*c* and to paging companies 30*a* and 30*b* for illustrative purposes.

The system 10 software will now be described with continued reference to FIG. 4. The system 10 preferably employs a distributed database to manage information relating to the system 10 configuration, the paging companies 30*a* and 30*b*, capcodes for radiopaging signals, hardwired line connections, the histories and configuration of each message playback device 24, client accounts, among other aspects of the system 10. The distributed database comprises a number of local or client databases 78 and a server database 80 maintained by the server 12. The server database 80 is synchronized with each of the client databases 78 in a manner described in further detail below. The server database 80 preferably stores records corresponding to the records maintained at each of the client computers 14. Since database changes (e.g., deletion of a message from a previously transmitted playlist) are generally initiated by clients via the client computers 14, the client databases do not overlap. Thus, record level arbitration is minimal.

In accordance with an embodiment of the present invention, the records in the distributed database are organized as a number of tables. The server database 80 preferably manages all of the tables, and each of the client databases 78 stores a subset of the tables, that is, those tables that are pertinent to that particular client. The distributed database can be created using, for example, the ACCESS 2.0 relational database architecture developed by Microsoft Corporation, Redmond, Wash.

Each client maintains its client database 78 via its client computer(s) 14. In other words, a client can use more than one computer 14 to access the server 12 if there is equipment (e.g., a client server (not shown)) to arbitrate client database modification requests generated by different client computers. The individual client databases 78 maintain records of messages, regions, remote sites and playlists pertaining to that particular client. A client database 78 can also be maintained for more than one person and/or business entity if those persons or businesses communicate with the server 12 using the same computer(s) 14 and client database 78.

The server 12 is preferably implemented as a set of applications on the CPU 68 and operates as a dedicated computer. In addition, the server 12 preferably operates as a communications hub in the network 16, establishing connections with the computers 14 to receive database changes therefrom and to synchronize the server database 80 to the client databases 78. Synchronization involves downloading database changes from each client database 78 to the server database 80. The server 12 then organizes the database changes into control signals which are sent to the paging companies 30*a* and/or 30*b* for broadcast to the message playback devices 24. The server 12 also performs administrative functions such as maintaining paging accounts and client billing.

The system 10 is preferably implemented using a demand-based client-server architecture to optimize telephone connect time during the synchronization process. A user can preferably access the client application at the computer 14 at any time. The client application, however, preferably must receive a log-on request message from the server 12 after a connection is established to begin synchronization. Thus, to optimize the call connection, the client computer 14 is not connected to the server 12 while the user is making changes to the client database. Once all of the database changes have been entered at the computer 14, the user can establish a call connection and synchronize with the server 12.

The client computers 14 are each preferably programmed using an on-demand, WINDOWS™-based client application on the CPU 56 which allows users to define remote sites, regions and message playlists. Each client database 78 comprises data relating to the identification codes corresponding to each message on the optical discs, the playlist currently in use at each remote site associated with the corresponding computer 14, alternate playlists (e.g., playlists having future effective dates), and data relating to each site and region associated with the corresponding client(s), among other data. Each computer 14 is also programmed to provide a graphic user interface by generating screens on the display device 60 for guiding a client when making changes to the client database 78 (e.g., defining a new site, region or playlist or modifying existing records). A number of the screens are described below in connection with FIGS. 19–28. The screens are created in a conventional manner using, for example, the relational database software such that data entered into the fields on the screens are processed and stored to tables and are otherwise used to generate message playlists.

Database tables will now be described with reference to FIGS. 5–18. The server database 80 comprises administrative tables that are specific to the server 12. For example, at least one table 82, as shown in FIG. 5, is stored in the server database 80 for each of the message playback devices 24. The configuration tables for the message playback devices 24 comprise a number of fields such as customer account number, an electronic serial number uniquely identifying that particular message playback device, at least one field specifying the regions in which that message playback device operates, a broadcast method number (BMN), and preferably one or two other fields with auxiliary BMNs, model and firmware identification numbers corresponding to the message playback device hardware and software, respectively, dates indicating when the message playback device configuration was last programmed and when the status of the message playback device was last read. In addition, the respective tables 82 for the message playback devices 24 are programmed to store information regarding successful transmission statistics, as well as fields for indicating total number of pages received, total number of corrupted pages, as well as total number of pages transmitted. A server port table 84 is depicted in FIG. 6 for storing data relating to ports used by the server 12.

A number of administrative tables are shared between the server database 80 and each of the client databases 78, such as a customer account table 86 (FIG. 7), a site table 88 (FIG.

8), and a region table 90 (FIG. 9). The customer account table 86 comprises fields for storing information such as customer account number, current and previous passwords, biographic information such as customer name, address, telephone number, facsimile number and contact name. Further, the customer account table 86 can comprise information such as name of the sales representative serving the customer and the dates on which the customer account table was created and last modified.

The site table 88 preferably comprises fields for storing information such as customer account number, site name and key, a synchronization code, site address, site manager name, an electronic serial number for the message playback device 24 serving that site, hours of operation, telephone and facsimile numbers, as well as dates on which a site table was created for a particular location and when the site table was last edited.

The site table 80 preferably contains information relating to a single site. Each site preferably specifies the location of a single message playback device 24. Synchronization codes are described with reference to FIG. 10. In order to reflect the state of tables or records in a client database 78, and records on the server 12 during synchronization, shared records are provided with a SSTATE field. The SSTATE field is provided with a value, as shown in the table 92 in FIG. 10, by the CPUs 56 or 68, depending on the transaction occurring between a client computer 14 and the server 12.

A region table 90 relates a local region name to a broadcast method. A region table 90 preferably comprises fields such as customer account number, region name, key, and status, a broadcast method number, a region number, a description of the region, as well as dates on which the region table was created and last modified.

In addition to administrative tables, the server and client databases 78 and 80 share message tables. Each message in the system 10 is preferably defined using two tables, that is, a message table 94 (FIG. 11) and a track correction (TCOR) table 96 (FIG. 12). The message table 94 defines a message currently in existence for a particular customer account. The TCOR table 96 provides per-site track translation to allow for the use of nonstandard compact discs used at the various sites. Unlike the customer account, region and site tables 86, 90 and 88, changes to message tables 94 are created at the server 12 and approved by clients. The synchronization status fields in these tables 94 and 96 therefore have different definitions, as indicated in the table 98 in FIG. 13. A synchronization status field in the message table can be provided with one of preferably five different status indicators (e.g., an integer number or other code) to indicate: (1) that a message has been entered into the server database 80 and needs to be sent to the client computer 14; (2) that a message has been downloaded to the client for approval; (3) that the message has been approved by the client; (4) that the message has been changed in the server database 80 and needs to be presented to the client; and (5) that the message has been approved in the client database 98 but the server needs to be notified.

In addition to the synchronization status field, a message table 94 comprises fields for storing information such as a customer account number, a message code which uniquely identifies that message, a descriptive title for the message, an indication of whether or not the message is a signature track, a library CD number and track number, a code for indicating whether or not the message was created using a mail or female voice, a field for storing the text of the message for generation if desired on a client computer screen 60, introduction time in seconds, reading time in seconds and trailer time in seconds, and the date on which the message was recorded. Entries in the message tables specify actual audio tracks on compact discs located at sites, as well as on the account library compact disc set. The unique message codes in the message tables preferably consist of a single letter followed by a number. The letter "S" preceding a message code indicates that the message is a signature track which is characterized by an additional signature index. The signature index allows, for example, intuitive representation of a single track which is used differently for different sites. The message code preferably comprises 32 bits, that is, an eight bit binary code for representing one of the letters A through Z, eight bits to denote the message number, and an additional eight bits to indicate the signature index. The remaining bits are preferably zeroes. When playlists are processed, the signature index is ignored.

The track correction table 96 provides a correction for terminated or otherwise misplaced tracks on a per-site basis. If a record exists for a particular site and a particular message, the specified correction in the table 96 overrides a track field in the message record; otherwise, a track assignment field in the message table 94 indicates that the message is an uncorrected track.

The system 10 preferably uses regions to describe broadcast coverage. The physical aspects of broadcast coverage, however, are described by a paging carrier, a capcode, and a region selector. The translation between the physical coverage model and the region model is defined by a broadcast method table 100 (FIG. 14) and a carrier table 102 (FIG. 15). The broadcast method table loo preferably comprises fields for storing broadcast method number, carrier key, a per-site identification number or PIN, a capcode, a format code, a frequency, a bandwidth and a coverage region. The broadcast method table 100 provides a relationship between a broadcast method and particular paging account for the system 10. The paging carrier table 102 preferably comprises fields for storing carrier name, carrier key, input format code, telephone number or computer on-line address, modem initialization string, ixo/TAP response and maximum packet size.

A playlist transmitted from a client computer 14 to the server 12 comprises a list of messages and a list of destinations which are represented in three related tables, that is, a playlist root table 104 (FIG. 16), a playlist message table 106 (FIG. 17) and a playlist site table 108 (FIG. 18). The tables are related using a sequence field. The sequence field in the playlist message table 106 and the playlist site table 108 comprises a command sequence identification code. The sequence field in the playlist root table 104 comprises a playlist sequence number. The other fields in the playlist root table are customer account, number, playlist name, a flag to indicate whether or not the playlist is urgent, a date on which to send the command to play the message playlist to the message playback devices 24, a creation date, a date indicating when the playlist root table 104 was last modified, a scheduled transmission date (i.e., a date that indicates when the playlist is transmitted, as opposed to when the message playback device 24 provides the compact disc player with the command to begin use of the playlist), and a synchronization status field.

The playlist message table 106 comprises fields for storing message codes for each of the messages in the playlist, as well as data indicating the relative position of the messages in the playlist according to a position or POS field. Messages characterized by lower POS values are played before messages having higher POS values. Further, if the message code specifies a signature track, then a message from a custom table is played; otherwise, the message code field specifies a message in the message table.

The playlist site table 108 comprises data relating to customer account, site key and site flag in addition to the comment command identification in the sequence field. The playlist site table 108 indicates progress of playlist transmission and stores a history of commands to determine which commands are sent to what sites. When a playlist is created, a client specifies which sites are to receive it. The set of sites is converted into multiple entries in this table 108 which describe the actual transmissions that are intended to reach all sites. The entries in the playlist site table 108 are provided to the server 12 during the synchronization process. When the server 12 transmits the command (i.e., message track numbers and site numbers for message playback devices 24 destined to receive the command), the server 12 scans through all of the playlist site table entries. The server 12 proceeds to prepare signals for transmission to each of the sites listed in the playlist site table. Following transmission, the server 12 changes the SENT field in the playlist site table 108 to a value corresponding to the condition "true". Further, the server 12 changes the SENT field in all other records related to the transmission to a value corresponding to "true", as well.

Figures 20, 25:
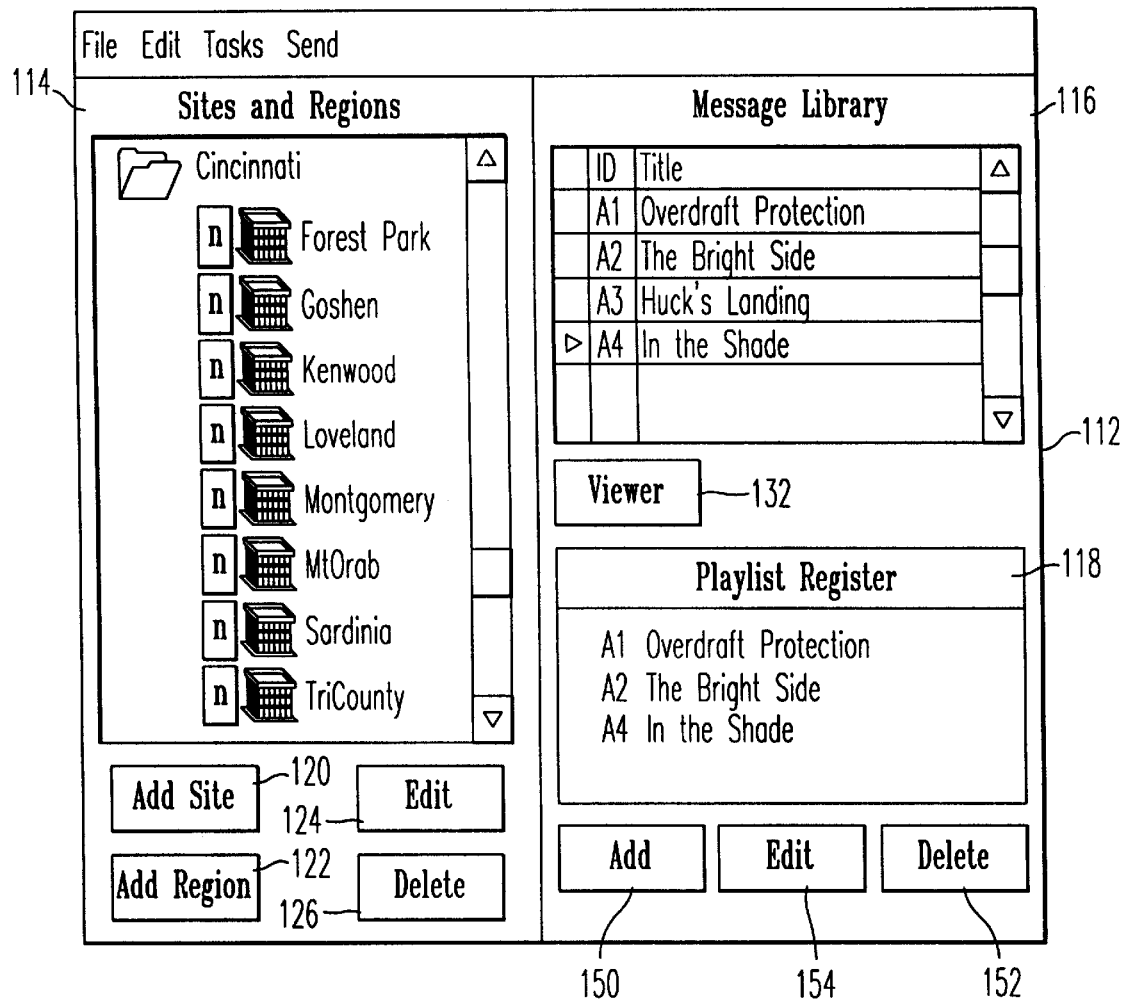
Figure 23:
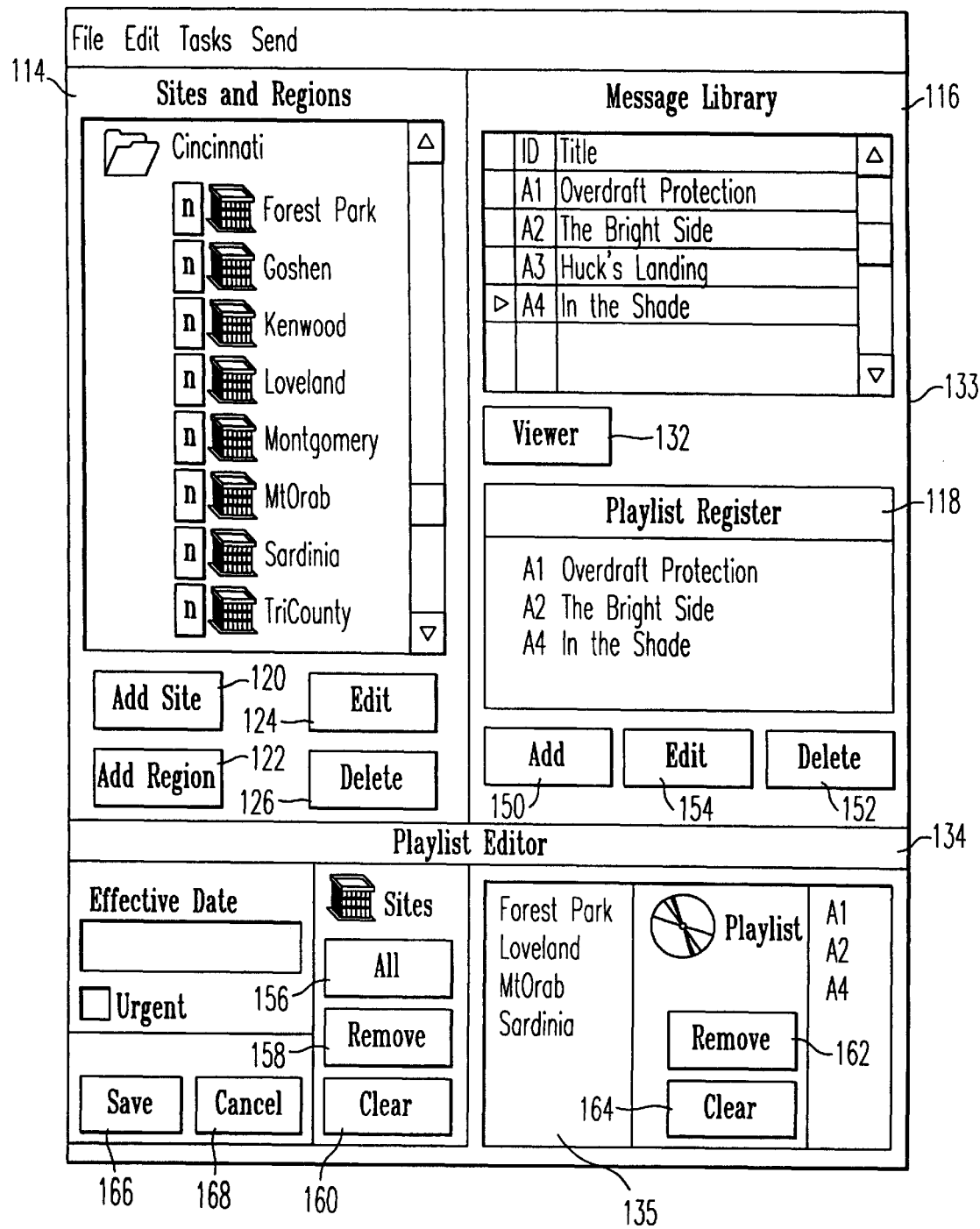

The client application on each of the computers 14 is programmed to generate a number of screens to guide a client through the process of generating message playlists, as well as modifying existing playlists for transmission to sites and regions. The client application allows a client to describe relationships between sites, regions, messages and playlists in graphical terms which are then recorded in the client database 78. A number of the screens are depicted in FIGS. 19–28. As shown in FIG. 19, a client computer is programmed to generate a log-on screen 110 which prompts the client to enter an account number and a password. Once a valid password is entered, the computer 14 is programmed to generate a main window screen 112, as shown in FIG. 20.

The main window screen 112 is divided into three areas 114, 116 and 118, entitled Sites and Regions, Message Library and Playlist Register, respectively. The Sites and Regions area 114 shows a tree list representing regions as folders. Sites are represented as small buildings, as described below in connection with FIG. 24. Sites are displayed when their corresponding region is double-clicked open using a mouse, for example. Four buttons 120, 122, 124 and 126 in this area 114 allow the client to add, delete and edit regions (e.g., regions 26 and 28) and sites (e.g., 18, 20 and 22). The Message Library area 116 shows a list of all of the messages available to the client, along with message titles and message codes. Double-clicking on any message in the list or clicking on the viewer button 132 opens a corresponding message viewer screen (e.g., screen 128 or 130 which are shown in FIGS. 21 and 22). A message viewer screen allows the client to view message parameters, to play a message on a CD-ROM at the computer 14 if the computer 14 is provided with an optional CD drive 131 (FIG. 3) and sound card (not shown), and to accept the message for playback from CDs located at selected remote sites. Finally, the Playlist Register area 118 indicates all pending playlists, as well as a history of playlists transmitted to the remote sites. Double-clicking on a pending playlist converts this area 118 into a Playlist Editor area 134, as shown in screen 133 of FIG. 23.

Figure 24:
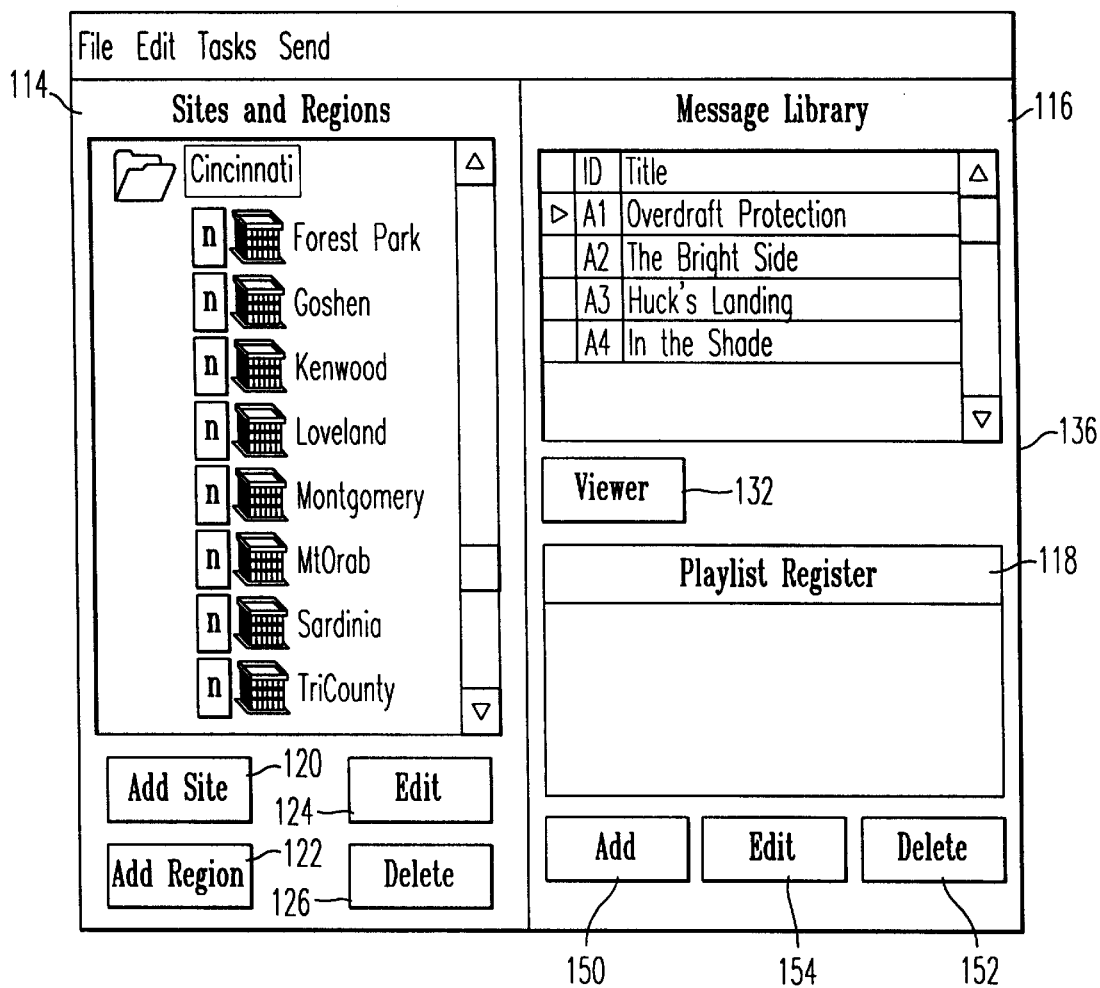

With continued reference to FIG. 20, if one of the region names (e.g., Cincinnati) in the area 114 is highlighted, the computer generates a screen 136, as shown in FIG. 24, which lists all of the sites associated with that region (e.g., Forest Park, Goshen and so on). With reference to FIG. 25, the client can specify certain parameters relating to a region by depressing the button 122 on screen 136 to obtain the screen 138. Because a region is preferably an abstract entity with most of its details managed by the server 12, in accordance with an embodiment of the present invention, the client is preferably limited to changing region name and description in fields 140 and 142, respectively. On the other hand, a client preferably has more latitude to edit data relating to a site, as indicated in FIGS. 26, 27 and 28. The screens 144, 146 and 148 depicted in these Figures illustrate how a client can enter biographical data regarding a site, the sequence of messages in a current playlist at a particular site, and a list of pending playlists and their effective dates (e.g., send dates).

With reference to FIG. 21, the message viewer screen 128 or 130 allows a client to preview the text or message copy, introduction, read and trail times of the message, whether or not the message was generated using a male or female voice, as well as the title and message code corresponding to that message. As stated previously, the message viewer screen 128 or 130 can be used to review messages currently available on CDs distributed to remote sites, and new messages received from the server 12 for release approval.

With reference to FIG. 20, by clicking the "add" or "delete" buttons 150 and 152, the client can add or remove a playlist from the Playlist Register area 118. By clicking the "edit" button 154, or double-clicking the playlist name in the area 118, the client can obtain the screen 133 in FIG. 23. The Playlist Editor area 134 indicates whether or not a playlist has an effective transmission date, the sites at which the playlist is to be played, as well as the messages in the playlist. Sites can be specified by dragging them on the display 60 via a mouse or other input device 62 from the Sites and Regions area 114 to the site editor area 135. Alternatively, the "All" button 156 can be clicked to automatically list all sites in the region highlighted in the area 114. Messages can be selected by clicking them in the Message Library area 116 or on the message viewer screen (e.g., screen 128 or 130). "Remove" and "Clear" buttons 158, 160, 162 and 164 are provided to remove selected ones or all of the sites and messages in the Playlist Editor area 134. The entries in the Playlist Editor area 134 can then be saved or canceled by clicking the "Save" button 166 or the "Cancel" button 168, respectively. The computer 14 is programmed via the client application to initiate a telephone call via its modem to the server 12 to relay the sites and regions configuration or playlist register data thereto. The telephone call is preferably initiated at midnight on the day that the "Save" button was depressed. If the "Urgent" button is clicked, the telephone call is initiated immediately after the "Save" button is clicked.

Figure 29:
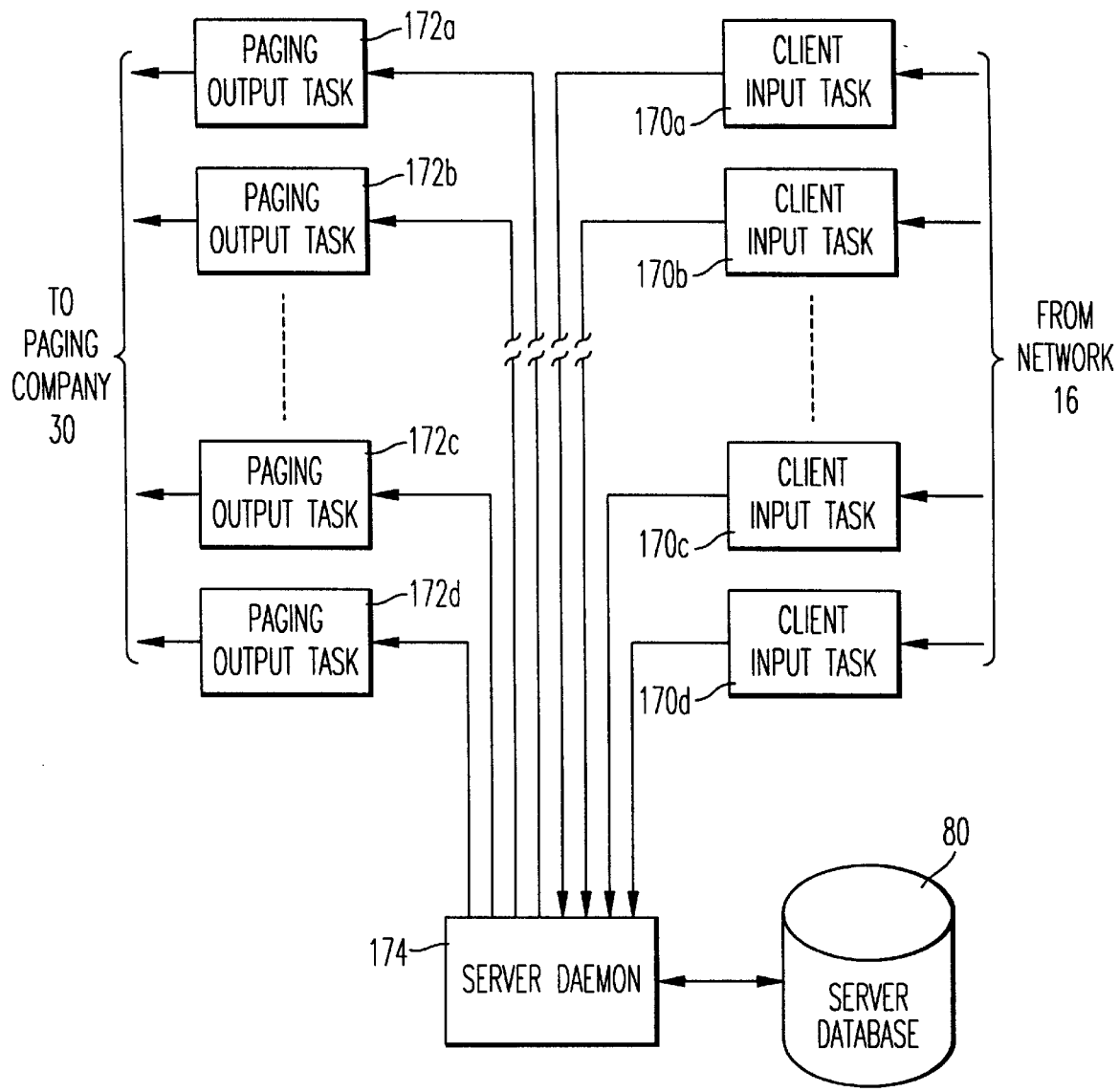
FIG. 29 is a schematic block diagram illustrating software modules in a server constructed in accordance with an embodiment of the present invention.
Figure 41:
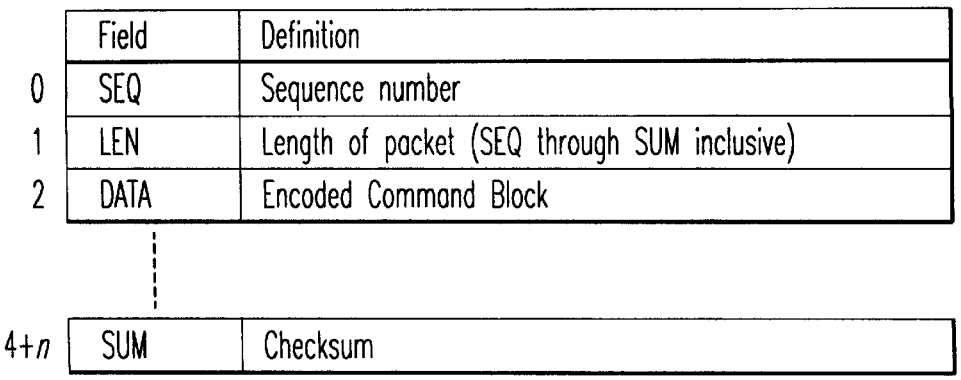
FIG. 41 illustrates the format of a packet transmitted between a server and a message playback device in accordance with an embodiment of the present invention.

The operation of the server 12 will now be described with reference to FIG. 29. The server 12 is the data interchange point of the system 10. The server 12 accepts calls from client applications at corresponding computers 14 and generates control signals for the radiopaging company 30 or other communication link. The server 12 transmits the control signals to remotely located message playback devices 24 having optical disc players 32 and one or more compact discs containing messages to control which of the messages are played and when they are played. The server 12 also collects billing information and maintains customer accounts with each client. The server 12 is programmed to perform client input tasks 170a, 170b, 170c and 170d which are preferably perpetual tasks that monitor a particular port on the server 12 for incoming calls from client computers 14. Four client input tasks are shown for illustrative purposes and shall be collectively referred to using reference numeral 170. The server 12 performs paging output tasks 172a, 172b, 172c and 172d which run on-demand, passing data packets to a paging company 30 for broadcast as radiopaging signals in such protocols as TNPP, TAP/ixo and SNPP. Similarly, four exemplary tasks are shown and shall hereinafter be collectively referred to as tasks 172. The server 12 is programmed with a daemon 174 which analyzes changes made to the database 80 by client input tasks 170, and sends packets to paging output tasks 172 to relay programming information to the remote message playback devices 24.

The client input tasks 170 can control a serial I/O port, a TCP/IP port or other communications interface, and are operable to accept calls from client applications on computer 14. The dialog between client input tasks 170 and client applications is preferably performed using a custom data transaction protocol (DTP), which is described below. When communicating with a client computer 14, each of the client input tasks 170 at the server 12 operates as a server, and the client application for that computer 14 operates as a slave. Communication is based on transactions which are initiated by one of the client input tasks (e.g., task 170a) and responded to by, for example, the client computer 14a. When a call is detected, the client input task 170a controls the computer 14a to prompt the client to enter a password and an account number. During synchronization, the client input task 170a also requests a list of all of the sites stored in that client database 78, all of the regions stored in that client database, as well as all of the playlists created at that computer 14a. This represents a method of passing forward notification of deleted sites, regions or playlists. The client input task 170a subsequently requests modified site records from the client computer, and continues to do so until the client computer responds with a null record to indicate that no more modified records exist. Similarly, the client input task 170a requests modified region records and modified playlist records from the client computer 14a, and does so until null records are received. The client input task 170a subsequently reports modified site records, modified region records and modified playlist records to the client application at the computer 14a. The client is therefore informed of the site records and region records that have been administratively activated or changed. The reporting transactions continue as long as the modified region and site records remain in the server database 80. The client is also informed of playlist records that have been transmitted. These reporting transactions continue as long as the modified playlist records remain in the server database 80. The client input task 170a is programmed to then conclude the session with the client computer 14a and terminate the connection on the network 16.

Paging output tasks 172 are protocol processing modules, which accept command packets generated by the server daemon 174 and deliver them to a paging company 30 via a communication link 16 or 17. The server daemon 174 is preferably a perpetual software processing module which monitors changes made to the server database 80 via client input tasks 170, determines when and how to update the message playback devices 24 and generates command packets accordingly. For example, when a client creates a new site or region, or makes a change to an existing site or region, one of the client input tasks (e.g., task 170c) at the server 12 communicates with the computer 14 (e.g., computer 14b) to receive data from that client application. The data is entered, for example, using the screens depicted in FIGS. 20 and 23. The client input task 170c subsequently records these modifications in the server database 80 during the next synchronization process. Depending on the nature of the change requested by the client, the server daemon 174 preferably operates in one of two ways. Since human interaction is preferably required to create new sites and regions in a client database, the tables for the new sites and regions contain an SSTATE field which is set to the parameter corresponding to the "New" state. The client computer (e.g., computer 14b) is programmed to retrieve data entered in the fields on the screens (e.g., screen 123) and to automatically provide it to account, site or region tables as necessary. The client computer 14b is also programmed to provide the modified tables to the server 12, along with playlist root tables 104, playlist message tables 106 and playlist site tables 108, during synchronization.

When the server daemon 174 encounters tables with the SSTATE field set to the variable "New", the daemon 174 takes no further action since an administrator at the server 12 processes the data received from the client computers 14 at a later time to set up the necessary server database records. When administrative changes are made by a client to an existing record or table, such as changing telephone numbers or points of contact, the server daemon 174 also takes no further action since such changes have no impact on the communication path to the message playback devices 24. When the region assignment of a particular site is changed, the server daemon 174 generates and sends a command packet to the message playback device 24 at that site to change the region assignment at that computer.

The primary task of the daemon 174 is preferably to send playlists to remote message playback devices 24 to control the sequence of messages played by, for example, CD players at the various sites 18, 20 and 22. Since the transmission method is preferably a one-way data broadcast, the server is programmed to conserve air time. Playlists are most efficiently sent to sites within particular regions. Each packet generated by the paging output tasks 172 comprises a header having bit flags. The bit flags are set to indicate which region numbers have been selected. All of the sites in a region are preferably provided with the same capcode. The flags, therefore, are used as a second level of discrimination. Use of regions assigned with unique identification codes allows a single playlist to be received by every message playback device 24 in a single region, or in a cross-section thereof, or in as many as 16 regions, for example.

As stated previously, the system 10 is configured to allow programming of individual sites and offers advantages such as the ability to play signature tracks at certain sites or regions. The more differences that exist between receiving sites; however, the more air time that is required by the system 10. The system 10 is therefore configured to optimize air time to manage various situations. For example, several playlists can be scheduled for the same transmission date with some of the playlists specifying sites in the same region. In some instances, playlists can specify only some of the sites in a region and leave other sites unchanged. Finally, track corrections can exist in one or two sites within a region and thereby complicate a regional playlist. These three types of situations can also be combined to determine the optimal strategy for transmitting a set of playlists. The server 12 is programmed to set up two models. First, the server 12 attempts to create one playlist that covers the largest number of sites. The server 12 calculates the total number of data required to transmit the playlist to all the sites in the affected regions and the individually addressed playlists being sent to sites not intended to play the first playlist. Second, the server 12 calculates the total amount of data required to individually address each site affected by the playlists. The server 12 generates command packets in accordance with the method requiring the least amount of data and forwards the command packets to one of the paging output tasks 172.

As stated previously, the client application at each computer 14 is programmed to generate screens to guide the user in describing relationships between sites, regions, messages and playlists. Activities are subsequently recorded by the client computer 14 in the client database 78 maintained at that computer. The database 78 is subsequently synchronized with the server database 80 at, for example, regular intervals to record changes made by clients at the server database 80. As stated previously, the protocol used for communication between client computers 14 and the server is preferably a customized Data Transaction Protocol (DTP). The DTP is a session-based, end-to-end protocol, which is designed to provide positive acknowledgment upon completion of each transaction. Transactions are preferably initiated by the server 12 regardless of whether they require changes to the server database 80 or to a client database 78. The DTP comprises two layers, that is, an upper layer and a lower layer. The lower layer corresponds approximately to the Data, Link, Network, Transport, Session and Presentation layers specified in the Open System Interconnection (OSI) reference model. The upper layer corresponds approximately to the Application layer of the OSI reference model. The lower level shall be described herein as a custom protocol; however, it can also be implemented as a wrapper for an industry standard protocol such as TCP/IP or IPX/SPX. Client applications and server software modules preferably run in a 32-bit WINDOWS™ environment.

Transaction in DTP between client computers 14 and the server 12 preferably comprise request messages and response messages. The server 12 preferably initiates a transaction with a request message, and the client computer preferably concludes the transaction with a corresponding response message. A request message can, for example, request a client computer 14 to change its database 78 or pass information required for the server 12 to change the server database 80. A response message, for example, reports that a change is complete or returns information from the client database 78 to the server 12. These transactions will be described in further detail below.

As stated previously, the lower layer provides the functionality corresponding to OSI reference model layers 2–6. It is therefore useful for operating with a physical layer comprising a UART 66, a modem 64 and a telephone line provided in each of the client computers 14 since it is a connection-oriented protocol. The lower layer converts request messages or response messages into preferably a single packet. The lower layer, therefore, relies on the upper layer for packet acknowledgment and packetizing. The lower layer notifies the upper layer when it is ready to receive a new message, and subsequently converts new messages into packets by prepending Start Flag, Length and Sequence bits and by calculating and appending a CRC-16 value, as shown in FIG. 30. When the lower layer receives packets, it validates the CRC-16 and checksum values. Packets having an incorrect checksum are ignored, as are packets that have already been processed. Valid packets are passed to the upper layer.

The lower layer operates in one of two modes, depending on whether it is servicing a client computer 14 or the server 12. In the client computer 14, the lower layer initiates a modem 64 call and notifies the upper layer when the first message is received from the server 12. In the server 12, the lower layer places the modem 76 therein in an auto-answer mode and requests the first message from the upper layer when a call from a client computer 14 is detected and a connection with the server 12 is established.

The upper layer operates as part of the client application or the server software (i.e., client input task 170). The upper layer manages communication on a transaction level, generating request messages and response messages as necessary.

A transaction is preferably encoded as an eight-bit function code value, followed by an arbitrary number of encoded, typed fields, as indicated in FIGS. 31–40. As stated previously, a transaction comprises a request message from the server 12 and a response message from a client computer. A number of transaction types can be created for use in the system 10. Exemplary transactions will now be described in connection with FIGS. 31–40.

The log-on transaction validates a session and is intended to be the first transaction after connection between a client computer 14 and the server 12 is established. The server 12 issues a log-on request message. The client computer 14 subsequently responds with a log-on response message, as indicated in FIG. 31. If the response message contains a valid account number and password, the server 12 continues to issue request messages until the session is complete, that is, after site, region and playlist rosters are sent, and site, region and playlist modification requests are sent, as described above. If the response message from the client computer 14 is incorrect, the server 12 preferably terminates the connection. As shown in FIG. 31, one of the fields corresponds to a new password field. If the new password field is not null, then the server 12 accepts the contents as the new password to be used for subsequent sessions on that particular account.

The response portion of a site roster transaction is depicted in FIG. 32. A request message for a list of sites from the server 12 preferably comprises no fields. The client computer 14 sends a complete list of sites in its client database 78 to the server 12. Sites in the server database 80 that are not found in this list are determined to have been removed by the client. Records (e.g., site tables 88) deleted in this manner are provided with flags for administrative attention by changing the SSTATE field to SSDEL which corresponds to a code indicating that a record has been deleted by the client and requires administrative attention. Sites in the client list that are not found in the server database 80 are determined to have been created by the user. The server 12 automatically adds these sites to the server database 80. The response segment of a region roster transaction is depicted in FIG. 33 and involves adding and deleting regions to and from, respectively, the server database 80 in a manner similar to the site roster transaction. A playlist roster transaction is depicted in FIG. 34. This transaction is similar to the playlist and region roster transactions, except that records are deleted from the server database 80, as opposed to being flagged for administrative attention.

With regard to the site modification transaction, the server 12 generates a request message to solicit the next site record in which changes have been made at the client computer 14 to which the server 12 is connected. The client computer 14 in return generates a response message having fields as indicated in FIG. 35. The fields in the corresponding server database record are then updated in accordance with the fields in the site modification response message generated by the client computer. If the NREGKEY field indicates that a region assignment change is requested, the SSTATE field in the corresponding server database table 88 is changed to SSPEND. If the record is new, the SSTATE field in the corresponding database table 88 is changed to SSNEW; otherwise, the SSTATE field is changed to SSREADY. Similarly, in a region modification transaction, the server 12 generates a request message to solicit the next region record or table at the client computer 14 in which changes have been made. The fields in the corresponding server database table 90 are then updated in accordance with the response message shown in FIG. 36. If the record is a new one, the SSTATE field in the table 90 is changed to SSNEW; otherwise, the SSTATE field in the table 90 is changed to SSREADY.

In a playlist modification transaction, the server 12 generates a request message to solicit the next playlist record in which changes have been made from the client computer 14 to which it is connected. The fields in the corresponding server database tables 104, 106 and 108 are updated in accordance with the response message depicted in FIG. 37. As with the region modification request, a new record is acknowledged by changing the SSTATE field to SSNEW; otherwise, the SSTATE field is changed to SSREADY. Since a playlist is represented by three tables, as described previously, the playlist modification transaction is more complex than the site or region modification transactions. The list of site keys in the response message corresponds to records in the playlist site table 108. The list of message codes corresponds to the fields in the playlist message tables 106, with the POS field being derived from the position of each message code in the transaction. Once a playlist has been transmitted to a message playback device (i.e., the SENT field Boolean value corresponding to the state "true")), the record at the message playback device becomes a read-only record that cannot be modified, but rather only replaced.

A site modification transaction involves the server generating a request message as shown in FIG. 38 to notify the client computer 14 of changes made to the site table 88. The only field effected by this transaction is preferably the SSTATE field since this transaction type is intended to facilitate notifying the client when administrative changes to a site record are complete. Similarly, the server generates a request in the region modification transaction shown in FIG. 39 to notify a client when administrative changes to a region record are complete.

During a playlist modification transaction, the server 12 generates a request message to notify a client of changes made to a playlist in the server database 80. Client tables are updated by the client computer 14 according to the fields in the request message as shown in FIG. 40. The SSTATE field in the client table is taken from the SSTATE field in the request message. The transaction informs the client that a playlist has been transmitted. As with the playlist modification request transaction, the site keys correspond to records in the playlist site table 108. The message codes correspond to records in the playlist message tables 106, with the POS field being derived from the position of each code in the transaction. In the case where a client attempts to change a playlist after it has been sent to the client computer 14, but before the client computer 14 has been notified, the server 12 ignores the modification requests and then notifies the client computer 14 of the change.

The protocol for communication between the server 12 and the message playback devices 24 will now be described in connection with FIGS. 41–52. The message playback generating devices 24 are the end points of the system 10. As stated previously, each message playback device 24 is a microcomputer-based device designed for installation into the chassis of a compact disc player 32 (CDP), for example. The message playback device is programmable to turn the CDP 32 on and off and to select tracks for repetitive play. The message playback device is preferably operational in a receive-only manner and is programmed to select command packets from the server 12 according to a number of parameters. Each message playback device has a unique identification code, a paging capcode and a region number. The region number can range, for example, from an integer from 0 to 15 in order to identify the region membership of that particular message playback device 24. The message playback device can receive commands encoded into alphanumeric radiopaging or other non-wireline communication signals; however, the same command structure can be used in wireline communication. The encoding, however, is different for radiopaging to account for a limited character set and the one-way nature of radiopaging. Each radiopaging signal, which is sent from the server 12 through the radiopaging company 30 to the message playback devices 24, preferably comprises a sequence number, a packet length, an encoded command and a single bit checksum. In addition, each radiopaging signal preferably corresponds to a single packet.

Command blocks are preferably limited such that one command block fits into one packet. The packets preferably use a limited, seven-bit character set for compatibility between several different paging systems. The transmission process is preferably unidirectional with no acknowledgment or other feedback mechanism. The receiver at each message playback device 24 can receive multiple transmissions of the same packet and replace damaged characters in an original packet with characters in subsequent packets having superior quality.

Figure 42:
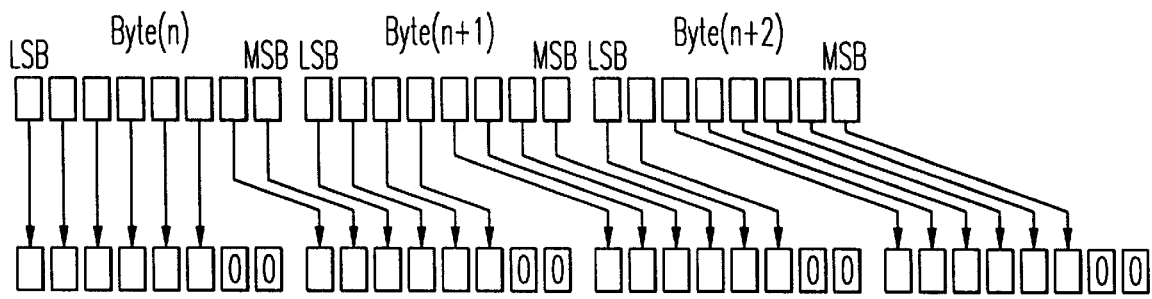
FIG. 42 is a diagram depicting an encoding process in accordance with an embodiment of the present invention.

The command block comprises a binary data block of arbitrary length. A six-bit encoding process converts the eight-bit binary data into six-bit words, as shown in FIG. 42. For compatibility with most processors, the resulting six-bit values are stored as eight-bit values with the zeros inserted into the two most significant bits. The packetizing process then adds a six-bit sequence number, a six-bit length code and a six-bit checksum to the binary data block to create a complete packet containing six-bit words. A character mapping process is then employed which uses a one-to-one map for converting six-bit words into seven-bit characters compatible with a paging network 30. The complete packet is then passed along with a PIN to a paging output task 172 at the server 12 to send the packet into a paging system 30 as an alphanumeric radiopaging signal. The paging output task 172 preferably uses an industry standard transport protocol such as ixo/TAP, TNPP or SNPP.

The paging company 30 subsequently receives the alphanumeric radiopaging signal, processes it and transmits it, accordingly. Using an industry standard paging format such as POCSAG, FLEX or ERMES, the message playback devices 24 each receive the page and decode the radiopaging signals into the original seven-bit packet, and error condition codes of each character. The seven-bit packet is then unmapped into a six-bit packet. If the six-bit packet contains bit errors which cannot be corrected using the paging format, the microcontroller 50 retains the six-bit packet in a voting buffer (not shown). Subsequent packets received with the same sequence number from the paging company 30 are provided to the voting buffer to replace damaged characters with superior quality characters. Once the buffer contains only undamaged characters, the command block is converted from six-bit words to the original eight-bit data block. The original command block is subsequently processed by the microcontroller 50 to obtain the command from the server 12.

Figure 43:
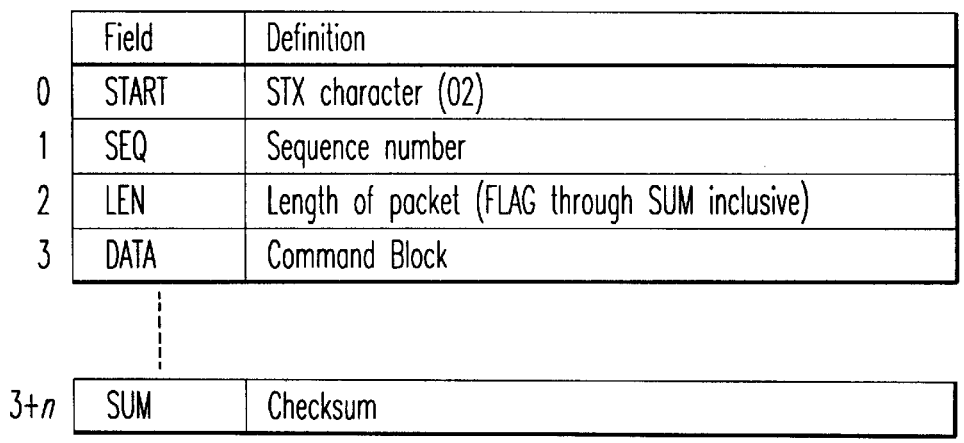

If wireline communication is employed, the server 12 and the message playback devices 24 are preferably connected using RS-232 lines and operate in an asynchronous mode at 9600 baud or higher with no parity bits and one stop bit. The packets are preferably preceded by a start flag and suffixed by an eight-bit checksum, as shown in FIG. 43. When a message playback device 24 receives a packet, the packet is checked for errors. If the packet contains errors or is not completely received, the message playback device ignores it; otherwise, the message playback devices act on the command contained therein and issues a response to the server 12.

Wireline communication is preferably divided into an upper layer corresponding to an OSI Applications layer, and a lower layer corresponding to OSI reference model layers 2 through 6. At the server 12, the upper layer is preferably divided into an in-process OLE server and a utility application. At the message playback device, both layers are preferably integrated directly into the microcontroller firmware. The physical layer is preferably RS-232C-based asynchronous communications hardware running at 9600 bites per second.

The command blocks for the message playback devices 24 are depicted in FIGS. 44–52. In FIG. 44, a command for program track list by region is depicted. The region mask field in the command is compared with the region programmed into the receiver 52 of the message playback device 24. If a 0 is found in this field, the command is ignored. If the command packet is accepted, the track numbers are stored in the non-volatile memory 55 of the message playback device and programmed into the controller 40 and compact disc player 32.

A command for message playlist by electronic serial number (ESN) is depicted in FIG. 45. The ESN field is compared with the electronic serial number programmed into the receiver 52 of the message playback device 24 receiving the command packet. If a match is found, track numbers are stored and programmed into the compact disc player; otherwise, the command is ignored. The commands for setting the ESN, capcodes and the region number are depicted in FIGS. 46–48. These numbers are stored into the non-volatile memory 55 of the message playback device 24.

The format of responses generated by the message playback devices following receipt of command packets are depicted in FIGS. 49–52. The message playback devices 24 are programmed to send a command complete response to the server 12 to indicate when the last received command was successfully completed, a command ignored response to indicate that the last command was ignored (i.e., because either the ESN or region fields did not match those programmed into the message playback device), an EEPROM write failure response to indicate that the last command could not be completed due to failure to write to the memory 55 and a status report.

The system 10 realizes a number of advantages over existing message delivery systems. The use of CD-ROM technology overcomes the aforementioned problems with endless loop cassette tapes and provides superior sound quality. The screens generated by the client computers 14 allow users to graphically select locations of message playback devices 24 at which selected messages are to be played via a MOH telephone system or other advertising device, as well as subsets or regions containing several message playback devices 24. The screens also permit users to create playlists by graphically selecting messages from a library of messages available at the message playback devices 24 and the order in which the messages are to be played. The playlists are transmitted to each of the message playback devices preferably via radiopaging or sent via a wireline communication link. Radiopaging is relatively inexpensive and minimizes installation costs (i.e., the message playback devices 24 are merely plugged into an existing power outlet and no further wiring is required). Thus, managers of private and public organizations can use the system 10 to program the information they wish to provide their customers via a MOH telephone system or other audio and/or visual advertising device from a remote location at any time during the day efficiently and cost-effectively.

While certain advantageous embodiments have been chosen to illustrate the invention, it will be understood by those skilled in the art that various changes and modifications can be made herein without departing from the scope of the invention as defined in the appended claims.

What is claimed is:

1. A programmable message delivery system for playing messages on message playback devices at one or more remote sites comprising:

a communication link;

a plurality of message playback devices, each of said message playback devices comprising a storage device for storing messages and for playing selected ones of said messages through an output of said message playback device; and a computer remotely located from said plurality of message playback devices and operable to generate and transmit control signals via said communication link for controlling at least one of said plurality of message playback devices;

each of said plurality of message playback devices being adapted to receive said control signals via said communication link, said control signals comprising identification data for identifying selected ones of said plurality of message playback devices and list data for identifying selected ones of said messages for playback by respective ones of said selected message playback devices, each of said selected message playback devices being programmable to access said messages identified therefor in said list data from said storage device and to provide said messages to said output until different ones of said messages are selected.

2. A system as claimed in claim 1, wherein said communication link is selected from the group consisting of a microwave link, a radio frequency link, a satellite link, a public switched telephone network, a private switched telephone network, a digital communications network, the Internet, and a fiber optic network.

3. A system as claimed in claim 1, wherein said control signals are transmitted to all of said plurality of message playback devices, each of said plurality of message playback devices comprising a receiver circuit for receiving said control signals and a processing device for processing said list data to operate in accordance with said control signals if said identification data corresponds to said message playback device.

4. A system as claimed in claim 3, wherein each of said plurality of message playback devices not identified in said control signals are operable to disregard said list data.

5. A system as claimed in claim 1, wherein said message playback device comprises a processing device, a storage device for storing said messages as respective files, and a receiver adapted to receive said control signals via said communication link, said computer being programmable to generate said control signals comprising commands for said processing device to access at least a selected one of said files to play a corresponding one of said messages through said output.

6. A system as claimed in claim 1, wherein each of said message playback devices comprises at least one message output apparatus comprising said output and selected from the group consisting of a music on-hold-compatible telephone system, an automated telephone answering system, a public address system, a visual display device, an electronically-controlled sign, an audiovisual apparatus, a videoconferencing device, and a multimedia announcement device.

7. A programmable message delivery system for playing messages on message playback devices at one or more remote sites comprising:
   a communication link;
   a plurality of message playback devices, each of said message playback devices comprising a storage device for storing messages and for playing selected ones of said messages through an output of said message playback device; and
   a computer remotely located from said plurality of message playback devices and operable to generate and transmit control signals via said communication link for controlling at least one of said plurality of message playback devices;
   each of said plurality of message playback devices being adapted to receive said control signals via said communication link and being programmable to access at least one of said messages from said storage device and to provide said accessed message to said output in accordance with said control signals;
   wherein said computer comprises a display device and is programmable to generate screens on said display device for guiding an operator to make choices selected from the group consisting of which of said messages are to be played, which of said plurality of message playback devices are to play said selected messages, a time of day when said control signals are to be transmitted to said message playback devices, a date on which said control signals are to be transmitted to said message playback devices, a sequence in which said selected messages are to be played, and how many times to repeat at least one of said selected messages in said sequence, and to generate said control signals to implement said choices via said message playback devices.

8. A system as claimed in claim 7, wherein at least one of said screens displays a location directory comprising a site name for each of said remote sites and guides said operator to select at least one of said remote sites, said computer being programmable to transmit said control signals to said remote sites selected by said operator.

9. A system as claimed in claim 7, wherein at least one of said screens displays names of regions corresponding to subsets of said remote sites and guides said operator to select at least one of said regions, said computer being programmable to generate control signals addressed to said remote sites in said regions selected by said operator.

10. A system as claimed in claim 9, wherein said subsets of said remote sites are selected from the group consisting of said remote sites located in contiguous geographical areas, said remote sites located in a plurality of noncontiguous geographical areas, said remote sites offering a similar service, and said remote sites corresponding to a particular client.

11. A system as claimed in claim 7, wherein at least one of said screens displays at least one of a list of titles and reference codes corresponding to said messages from which said operator can select a plurality of said messages for play at said remote sites, said computer being programmable to generate a playlist comprising data relating to said plurality of messages and to generate said control signals to implement said playlist using said message playback devices.

12. A system as claimed in claim 11, wherein at least one of said screens comprises a script corresponding to at least one of said messages identified in said at least one of said screens.

13. A system as claimed in claim 11, wherein one of said screens comprises at least one of a current playlist and a pending playlist for a selected one of said remote sites, said current playlist and said pending playlist each comprising said reference codes corresponding to said selected messages, said pending playlist further comprising a date corresponding to when said pending playlist is to be transmitted to said message playback devices.

14. A system as claimed in claim 11, wherein said screen also displays a list of names corresponding to said remote sites and guides said operator to select said remote sites at which said messages on said playlist are to be played.

15. A system as claimed in claim 14, wherein said screen allows said operator to specify at least one of a plurality of parameters selected from the group consisting of a time of day when said control signals are to be transmitted to said message playback devices, a date on which said control signals are to be transmitted to said message playback devices, a sequence in which said selected messages are to be played, and how many times to repeat said selected messages in said sequence at said selected remote sites.

16. A system as claimed in claim 11, wherein said screen guides said operator to select one of said messages from said playlist and an operation selected from the group consisting of adding at least one of said messages to said playlist, deleting at least one of said messages to said playlist, changing said sequence of said messages on said playlist, and changing at least one of the date or time for playing at least one of said messages.

17. A programmable message delivery system for playing messages at multiple remote sites comprising:
   a communication link;
   a plurality of message playback devices, each of said message playback devices comprising a storage device for storing messages and for playing selected ones of said messages through an output of said message playback device; and
   a first computer for generating and transmitting control signals via said communication link for controlling at least one of said plurality of message playback devices, each of said plurality of message playback devices being adapted to receive said control signals via said communication link;
   a plurality of second computers, each of said plurality of second computers being configured to communicate with said first computer and being programmable to generate screens for guiding an operator to make choices selected from the group consisting of which of said messages is to be played, which of said plurality of message playback devices is to play said selected message, which of a number of subsets of said plurality of message playback devices is to play said selected message, and when said selected message is to commence playing, and to transmit data signals relating to said choices to said first computer, said first computer being programmable to generate said control signals in accordance with said data signals.

18. A system as claimed in claim 17, wherein each of said plurality of second computers is operable to store data selected from the group consisting of data relating to each of said remote sites associated with said second computer, at least one of identification codes and titles for uniquely identifying each of said messages stored via aid storage device, and message playlists comprising said identification codes of selected ones of said messages for play at said associated remote sites.

19. A system as claimed in claim 18, wherein said first computer is operable to store said data and each of said plurality of second computers is programmable to send modifications to said data stored therein to said first computer, said first computer being programmable to update said data stored therein and to generate and transmit control signals in accordance with said modifications.

20. A system as claimed in claim 17, further comprising a third computer for generating and transmitting said control signals via said communication link for controlling at least one of said plurality of message playback devices, at least one of said plurality of message playback devices being adapted to receive said control signals from said third computer via said communication link, at least one of said plurality of second computers being configured to communicate with said third computer in lieu of said first computer.

21. A system as claimed in claim 17, wherein each of said message playback devices comprises at least one message output apparatus comprising said output and selected from the group consisting of a music on-hold-compatible telephone system, an automated telephone answering system, a public address system, a visual display device, an electronically-controlled sign, an audiovisual apparatus, a videoconferencing device, and a multimedia announcement device.

22. A method of programming message playback devices located at multiple remote sites comprising the steps of:
storing a library of discrete and individually accessible messages at each of said remote sites;
storing at least one of a title and an identification ode for uniquely identifying each said message at a computer located remotely with respect to said message playback devices;
storing site data relating to at least a selected one of said remote sites at said computer;
selecting at least one said message from said library for play at said selected remote site using said computer;
generating a control signal using said computer for said message playback device corresponding to said selected remote site to play said selected message; and
transmitting said control signal to at least said selected remote site.

23. A method as claimed in claim 22, further comprising the steps of:
receiving said control signal at said selected remote site;
accessing said selected message from said library stored at said selected remote site; and
playing said selected message on said message playback device at said selected remote site.

24. A method as claimed in claim 22, further comprising the steps of:
defining a subset of said remote sites using a unique region code, said control signal comprising said region code, said transmitting step comprising the step of transmitting said control signal at least to all of said emote sites in said subset;
receiving said control signal at each of said remote sites in said subset;
accessing said selected message from said library stored at said remote sites in said subset; and
playing said selected message on said message playback device at each of said remote sites in said subset.

25. A method as claimed in claim 22, wherein said messages are stored on at least one optical disc at each of said remote sites and each of said remote sites comprises an optical disc player, said generating step comprising the steps of:
converting said identification code of said selected message into a number for a corresponding track on said optical disc at said selected remote site; and
generating a command for said optical disc player at said selected remote site to advance to said track and play said selected message.

26. A method of programming message playback devices located at multiple remote sites comprising the steps of:
storing a library of discrete and individually accessible messages at each of said remote sites;
storing message data for each said message at a first computer located remotely with respect to said message playback devices;
storing site data relating to at least two selected said remote sites at said first computer;
selecting different sets of said messages from said library using said first computer for play at respective said selected remote sites;
generating control signals for commanding said message playback devices corresponding to said selected remote sites to play respective said sets of messages; and
transmitting said control signals to at least said selected remote sites.

27. A method as claimed in claim 26, further comprising the steps of:
receiving said control signals at said selected remote sites;
accessing said sets of messages from said library at respective said selected remote sites in accordance with said control signals; and
playing said sets of messages on said message playback devices at respective said selected remote sites.

28. A method of programming message playback devices located at multiple remote sites comprising the steps of:
storing a library of discrete and individually accessible messages at each of said remote sites, each message being uniquely identified by at least one of an identification code and a title;
storing said at least one of said identification code and said title for each said message at a computer located remotely with respect to said message playback devices;
storing site data relating to said remote sites at said computer;

generating at least one computer screen using said computer to display a list of location names corresponding to said remote sites and a list of each said message;

entering playlist data using said at least one computer screen selected from the group consisting of said identification codes of selected ones of said messages, said titles of selected ones of said messages, times for commencing the play of said messages, and selected ones of said remote sites at which said messages are to be played;

generating a control signal using said playlist data; and transmitting said control signal to said remote sites.

29. A method as claimed in claim 28, further comprising the steps of:

receiving said control signal at said remote sites;

accessing said selected messages from said library stored at respective said selected remote sites; and playing said selected messages on said message playback devices at respective said selected remote sites.

30. A programmable message delivery system for playing messages comprising:

a storage device for storing discrete, individually accessible messages;

a processor connected to said storage device and programmable to access at least one of said messages;

an input device connected to said processor;

a display device connected to said processor; and at least one message output apparatus selected from the group consisting of a music on-hold-compatible telephone system, a public address system, a visual display device, an electronically-controlled sign, an audiovisual apparatus, a videoconferencing device, and a multimedia announcement device, said message output apparatus comprising an input and an output, said processor being programmable to generate at least one screen on said display device to display message data relating to each of said messages, said message data selected from the group consisting of a message titles corresponding to respective ones of said messages, message identification codes corresponding to respective said messages, and text of at least one of said messages, said processor being programmable to allow an operator to select at least one of said messages using said message data and said input devices to access said selected message via said storage device and to provide said selected message to said input of said message output apparatus for play through said output of said message output apparatus.

31. A system as claimed in claim 30, wherein said operator can select a sequence of said messages, said processor being programmable to access each of said selected messages via said storage device to provide said messages to said input for play on said output in accordance with said sequence.

32. A message playback device for playing selected messages from an optical disc, the message playback device being remotely controllable via a broadcast transmission system and comprising:

an optical disc system for playing at least one optical disc and providing signals generated therefrom to an output;

a first processor being programmed to generate control signals to control operation of said optical disc system;

a receiver unit; and a second processor connected to said first processor and to said receiver unit, said receiver unit being operable to receive command signals transmitted thereto from said broadcast transmission system and to provide said command signals to said second processor, said command signals identifying selected tracks on said at least one optical disc, said second processor being programmed to convert said command signals into corresponding ones of said control signals to play said selected tracks on said optical disc system and to provide said corresponding ones of said control signals to said first processor until different said tracks on said at least one optical disc are selected.

33. A programmable message delivery system for playing messages on message playback devices at one or more remote sites comprising:

a communication link;

a plurality of message playback devices, each of said message playback devices comprising a storage device for storing messages and for playing selected ones of said messages through an output of said message playback device; and a computer remotely located from said plurality of message playback devices and operable to generate and transmit control signals via said communication link for controlling at least one of said plurality of message playback devices;

each of said plurality of message playback devices being adapted to receive said control signals via said communication link and being programmable to access at least one of said messages from said storage device and to provide said accessed message to said output in accordance with said control signals;

wherein said message playback device comprises an optical disc player, a processing device, a disc having tracks for storing said messages, and a receiver adapted to receive said control signals via said communication link, said control signals comprising commands for said processing device to control said optical disc player access to at least a selected one of said tracks and play a corresponding one of said messages.

34. A remotely controllable message playback device for playing selected messages from an optical disc comprising:

an optical disc system for playing at least one optical disc and providing signals generated therefrom to an output;

a first processor being programmed to generate control signals to control operation of said optical disc system;

a receiver unit; and a second processor connected to said first processor and to said receiver unit, said receiver unit being operable to receive command signals transmitted thereto and to provide said command signals to said second processor, said second processor being programmed to convert said command signals into corresponding ones of said control signals and to provide said corresponding ones of said control signals to said first processor;

wherein said command signals are selected from the group consisting of a radio frequency signal and a wireline communication signal.

35. A remotely controllable message playback device as claimed in claim 34, wherein said command signals are radiopaging signals, said receiver unit being configured to demodulate radiopaging signals and to provide said demodulated signals to said second processor.

36. A remotely controllable message playback device as claimed in claim 34, wherein said command signals comprise at least one of a plurality of datum selected from the group consisting of a track number corresponding to a track on said at least one optical disc that is desired to be played and provided to said output of said optical disc system, an identification code for uniquely identifying said message playback device, a site code for uniquely identifying a site at which said message playback device is located, a region code for uniquely identifying the geographic region in which said message playback device is located, and a radiopaging capcode.

* * * * *

(12) EX PARTE REEXAMINATION CERTIFICATE (8332nd)
United States Patent
Hazenfield

(10) Number: US 5,991,374 C1
(45) Certificate Issued: Jun. 21, 2011

(54) PROGRAMMABLE MESSAGING SYSTEM FOR CONTROLLING PLAYBACK OF MESSAGES ON REMOTE MUSIC ON-HOLD-COMPATIBLE TELEPHONE SYSTEMS AND OTHER MESSAGE OUTPUT DEVICES

(75) Inventor: Joey C. Hazenfield, Cincinnati, OH (US)

(73) Assignee: Info-Hold, Inc., Cincinnati, OH (US)

Reexamination Request:
No. 90/009,671, Jan. 22, 2010

Reexamination Certificate for:
Patent No.: 5,991,374
Issued: Nov. 23, 1999
Appl. No.: 08/694,854
Filed: Aug. 8, 1996

(51) Int. Cl.
*H04H 20/00* (2006.01)
*H04M 3/428* (2006.01)
*H04M 3/42* (2006.01)
*H04M 3/487* (2006.01)

(52) U.S. Cl. .................. 379/101.01; 379/88.11; 379/88.22

(58) Field of Classification Search .................. None
See application file for complete search history.

(56) References Cited

U.S. PATENT DOCUMENTS

| | | | |
|---|---|---|---|
| 4,720,873 A | 1/1988 | Goodman et al. |
| 4,920,556 A | 4/1990 | Wong |
| 5,133,081 A | 7/1992 | Mayo |
| 5,168,481 A | 12/1992 | Culbertson et al. |
| 5,276,909 A | 1/1994 | Milner et al. |
| 5,318,450 A | 6/1994 | Carver |
| 5,355,302 A | 10/1994 | Martin et al. |
| 5,374,961 A | 12/1994 | Jung |
| 5,448,290 A | 9/1995 | Van Zeeland |
| 5,475,835 A | 12/1995 | Hickey |
| 5,497,502 A | 3/1996 | Castille |
| 5,504,921 A | 4/1996 | Dev et al. |
| 5,506,821 A | 4/1996 | Burton, Jr. |
| 5,539,635 A | 7/1996 | Larson, Jr. |
| 5,596,750 A | 1/1997 | Li et al. |
| 5,629,867 A | 5/1997 | Goldman |
| 5,668,788 A | 9/1997 | Allison |
| 5,699,526 A | 12/1997 | Siefert |
| 5,721,878 A | 2/1998 | Ottesen et al. |
| 5,726,909 A | 3/1998 | Krikorian |

(Continued)

OTHER PUBLICATIONS

DAD486x Manual Ver. 4.0 (c) 1994, ENCO Systems. (Exhibit. F).
SOH Productions, Productions, date unknown (2 pgs).
Carrie Borzillo, SW Networks to Office New Formats, Programs in Early '95, Billboards Publications, Oct. 22, 1994 (3 pgs).

(Continued)

*Primary Examiner* — Roland G Foster

(57) ABSTRACT

A remotely programmable message delivery system comprises a number of client computers which communicate with a server to send control signals to one or more remote message playback devices. The message playback devices are each provided with a library of messages, and comprise at least one music on-hold-compatible telephone system, a public address system or other audio and/or visual advertising device. Message playlists from the client computers can be sent via the server to the message playback devices by a communication link such as a radiopaging system. The client computer is programmed to generate screens for guiding an operator to select messages from the library of messages and the order and times at which they are to be played by selected message playback devices. Message playback devices can be organized into one or more regions to allow a message playlist to be sent to more than one message playback device using a single radiopaging signal. The client computer can also generate screens to display the text of selected messages.

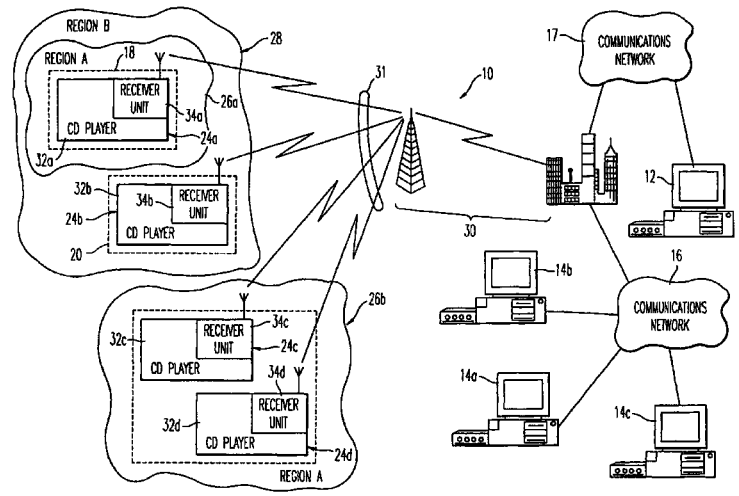

U.S. PATENT DOCUMENTS

| | | | |
|---|---|---|---|
| 5,731,844 | A | 3/1998 | Rauch et al. |
| 5,734,961 | A | 3/1998 | Castille |
| 5,774,063 | A | 6/1998 | Berry et al. |
| 5,796,951 | A | 8/1998 | Hamner et al. |
| 5,912,958 | A | 6/1999 | Eyraln et al. |
| 5,918,213 | A | 6/1999 | Bernard et al. |
| 5,930,493 | A | 7/1999 | Ottesen et al. |
| 5,942,986 | A | 8/1999 | Shabot et al. |
| 5,963,964 | A | 10/1999 | Nielsen |
| 6,032,177 | A | 2/2000 | O'Donnell |
| 6,047,129 | A | 4/2000 | Frye |
| 6,058,288 | A | 5/2000 | Reed et al. |
| 6,064,723 | A | 5/2000 | Cohn et al. |
| 6,101,324 | A | 8/2000 | Connell et al. |
| 6,111,539 | A | 8/2000 | Mannings et al. |
| 6,121,593 | A | 9/2000 | Mansbery et al. |
| 6,145,088 | A | 11/2000 | Stevens |
| 6,168,563 | B1 | 1/2001 | Brown |
| 6,260,067 | B1 | 7/2001 | Barnhouse |
| 6,261,103 | B1 | 7/2001 | Stephens |
| 6,267,644 | B1 | 7/2001 | Molnar |
| 6,490,346 | B2 | 12/2002 | Lee et al. |
| 6,526,041 | B1 | 2/2003 | Shaffer et al. |
| 6,741,683 | B1 | 5/2004 | Shelton et al. |
| 2001/0046392 | A1 | 11/2001 | Lee |

OTHER PUBLICATIONS

Chris McConnell, Companies Combine to Customize Radio Addressable Network and Disk Storage Could Product Customizable Feel, Broadcasting & Cable, v124 n.40, Oct. 3, 1994 (2 pgs).

Chris McConnell, SMARTS Broadcasting is Automating Eight Radio Stations in Sweden, Broadcasting and Cable, v124 n.31, Aug. 1, 1994 (1 pg).

Jason Hobby, A System For the Sound of Music, Computer Weekly n1248, Feb. 7, 1991 (2 pgs).

Richard Majestic, Digital Video Broadcasting The Bottom Line, Broadcast Engineering, May 1996 (6 pgs).

Charlie Goode, Commercial–Insertion Systems, Broadcast Engineering, Apr. 1996 (4 pgs).

Garrett Wood, NAB 96 Review—Radio Automation Systems, BE Radio, May/Jun. 1996 (2 pgs).

Kevin McNamara, Audio Backhaul, Program Distribution, Monitoring and Accessories, BE Radio, May/Jun. 1996 (3 pgs).

Yasmin Hashmi and Stella Plumbridge, Radio Automation Systems, BE Radio, May/Jun. 1997 (3 pages).

Yasmin Hashmi and Stella Plumbridge, Computer–Based System Profiles, BE Radio, May/Jun. 1997 (12 pgs).

Chip Morgan, Consolidating Facilities, BE Radio, Nov./Dec. 1997 (7 pgs).

Julie Pitta, Choking On a Silver Spoon, Forbes, May 9, 1994 (2 pgs).

Doing The Foxtrot, Information Week, Nov. 11, 1991 (1 pg).

Paul M. Eng and John W. Verity, Let FroxSystem Enterain You, Business Week, Nov. 4, 1991 (2 pgs).

Consumer Electronics; OutFroxed, The Economist, Oct. 26, 1991 (2 pgs).

George Gilder, Now or Never, Forbes, Oct. 14, 1991 (6 pgs).

George Gilder, Into the Telecosm, Harvard Business Review, Mar./Apr. 1991 (15 pgs).

Brenton R. Schlender, Couch Potatoes! Now It's Smart TV, Fortune, Nov. 20, 1989 (5 pgs).

Marc A. Hamilton, Video Distribution Systems for Local Area Networks, IEEE, 1985 (9 pgs).

Fong–Fui Chain, Shiau–Shiang Jiang, Long–Yih Chu, A Remote Multi–Camera Visual Surveillance System, 10th Conference On Local Computer Networks, Oct. 7–9, 1985 (6 pgs).

Harry Frankel, Stephen Ritter, Andrew Bernat, An Automated Imaging System for Border Control, IEEE 1988 Int'l Carnahan Conference on Security Technology, Oct. 5–7, 1988 (7 pgs).

Kevlin C. Haire, Hopkins Feeds Health News to Far–Flung Radio Stations, Baltimore Business Journal, Jul. 28, 1995 (2 pgs).

Mark Seavy, Frox Launches It's Home Theater System, HFD, Oct. 21, 1991 (2 pgs).

Herbert H. Howard, Michael S. Kievman, Barbara A. Moore, Radio, TV and Cable Programming (2d Ed.), Iowa State University Press, 1994 (6 pgs).

Lincoln Diamant, The Broadcast Communication Dictionary (3d Ed.), Greenwood Press, 1989 (3 pgs).

Martin H. Weik, Communications Standard Dictionary (3d Ed.), Chapman & Hall, 1996 (3 pgs).

Michael C. Keith, The Radio Station (5th Ed.), Focal Press, 2000 (3 pgs).

Steven Warren, Radio The Book (4th Ed.), Focal Press, 2005 (3 pgs).

Dynamic Digital Announcers, Teleconnect, Jan. 1991 (20 pgs).

Intercom & Paging Parade—Buyer's Guide, Teleconnect, Oct. 1991 (9 pgs).

Digital Announcer Panorama, Teleconnect, Jan. 1992 (21 pgs).

Alison Ousey, Nel–Tech Labs' Telink 700 MOH Player, Teleconnect, Jul. 1996 (2 pgs).

US 5,991,374 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 5 are cancelled.

Claims 7, 13, 17, 19, 22-28, 30 and 32-35 are determined to be patentable as amended.

Claims 8-12, 14-16, 18, 20, 21, 29, 31 and 36, dependent on an amended claim, are determined to be patentable.

New claims 37-39 are added and determined to be patentable.

Claims 3, 4 and 6 were not reexamined.

7. A programmable message delivery system for playing messages on message playback devices at one or more remote sites comprising:
   a communication link;
   a plurality of message playback devices, each of said message playback devices *communicating with a respective telephone system and* comprising a storage device for storing messages and for playing selected ones of said messages through an output of said message playback device *when a caller is placed on hold*; and
   a computer remotely located from said plurality of message playback devices and operable to generate and transmit control signals via said communication link for controlling at least one of said plurality of message playback devices;
   each of said plurality of message playback devices being adapted to receive said control signals via said communication link and being programmable to access at least one of said messages from said storage device and to provide said accessed message to said output in accordance with said control signals *when a caller is placed on hold*;
   wherein said computer comprises a display device and is programmable to generate screens on said display device [for] *that include user selectable menu items for selection by an operator to define relationships between said plurality of message playback devices and said messages, the screens* guiding an operator to make choices selected from the group consisting of which of said messages are to be played, which of said plurality of message playback devices are to play said selected messages, a time of day when said control signals are to be transmitted to said message playback devices, a date on which said control signals are to be transmitted to said message playback devices, a sequence in which said selected messages are to be played, and how many times to repeat at least one of said selected messages in said sequence, and to generate said control signals to implement said choices via said message playback devices.

13. [A system as claimed in claim 11.] *A programmable message delivery system for playing messages on message playback devices at one or more remote sites comprising:*
   *a communication link;*
   *a plurality of message playback devices, each of said message playback devices comprising a storage device for storing messages and for playing selected ones of said messages through an output of said message playback device; and*
   *a computer remotely located from said plurality of message playback devices and operable to generate and transmit control signals via said communication link for controlling at least one of said plurality of message playback devices;*
   *each of said plurality of message playback devices being adapted to receive said control signals via said communication link and being programmable to access at least one of said messages from said storage device and to provide said accessed message to said output in accordance with said control signals;*
   *wherein said computer comprises a display device and is programmable to generate screens on said display device for guiding an operator to make choices selected from the group consisting of which of said messages are to be played, which of said plurality of message playback devices are to play said selected messages, a time of day when said control signals are to be transmitted to said message playback devices, a date on which said control signals are to be transmitted to said message playback devices, a sequence in which said selected messages are to be played, and how many times to repeat at least one of said selected messages in said sequence, and to generate said control signals to implement said choices via said message playback devices;*
   *wherein at least one of said screens displays at least one of a list of titles and reference codes corresponding to said messages from which said operator can select a plurality of said messages for play at said remote sites, said computer being programmable to generate a playlist comprising data relating to said plurality of messages and to generate said control signals to implement said playlist using said message playback devices; and*
   *wherein one of said screens comprises at least one of a current playlist and a pending playlist for a selected one of said remote sites, said current playlist and said pending playlist each comprising said reference codes corresponding to said selected messages, said pending playlist further comprising a date corresponding to when said pending playlist is to be transmitted to said message playback devices.*

17. A programmable message delivery system for playing messages at multiple remote sites comprising:
   a communication link;
   a plurality of message playback devices, each of said message playback devices *communicating with a respective telephone system and* comprising a storage device for storing messages and for playing selected ones of said messages through an output of said message playback device *when a caller is placed on hold*; [and]
   a first computer for generating and transmitting control signals via said commuication link for controlling at least one of said plurality of message playback devices, each of said plurality of message playback devices being adapted to receive said control signals via said communication link; *and* a plurality of second computers, each of said plurality of second computers being configured to communicate with said first computer and being programmable to generate screens [for] *that include user selectable menu items for selection by an operator to define relationships between said plurality of message playback devices and said messages, the screens* guiding an operator to make choices selected from the group consisting of which of said messages is to be played, which of said plurality of message playback devices is to play said selected message, which of a number of subsets of said plurality of message playback devices is to play said selected message, and when said selected message is to commence playing, and to transmit data signals relating to said choices to said first computer, said first computer being programmable to generate said control signals in accordance with said data signals.

19. [A system as claimed in claim 18,] *A programmable message delivery system for playing messages at multiple remote sites comprising:*

*a communication link;*

*a plurality of message playback devices, each of said message playback devices comprising a storage device for storing messages and for playing selected ones of said messages through an output of said message playback device;*

*a first computer for generating said transmitting control signals via said communication link for controlling at least one of said plurality of message playback devices, each of said plurality of message playback devices being adapted to receive said control signals via said communication link; and*

*a plurality of second computers, each of said plurality of second computers being configured to communicate with said first computer and being programmable to generate screens for guiding an operator to make choices selected from the group consisting of which of said messages is to be played, which of said plurality of message playback devices is to play said selected message, which of a number of subsets of said plurality of message playback devices is to play said selected message, and when said selected message is to commence playing, and to transmit data signals relating to said choices to said first computer, said first computer being programmable to generate said control signals in accordance with said data signals;*

*wherein each of said plurality of second computers is operable to store data selected from the group consisting of data relating to each of said remote sites associated with said second computer, at least one of identification codes and titles for uniquely identifying each of said messages stored via aid storage device, and message playlists comprising said identification codes of selected ones of said messages for play at said associated remote sites; and*

*wherein said first computer is operable to store said data and each of said plurality of second computers is programmable to send modifications to said data stored therein to said first computer, said first computer being programmable to update said data stored therein and to generate and transmit control signals in accordance with said modifications.*

22. A method of programming message playback devices located at multiple remote sites *and communicating with respective telephone systems, the method* comprising the steps of:

storing a library of discrete and individually accessible messages at each of said remote sites;

storing at least one of a title and an identification [ode] *code* for uniquely identifying each said message at a computer located remotely with respect to said message playback devices;

storing site data relating to at least a selected one of said remote sites at said computer;

selecting at least one said message from said library for play at said selected remote site using said computer;

generating a control signal using said computer for said message playback device corresponding to said selected remote site to play said selected message *when a caller is placed on hold on the respective telephone system*; and transmitting said control signal to at least said selected remote site.

23. A method as claimed in claim 22, further comprising the steps of:

receiving said control signal at said selected remote site;

accessing said selected message from said library stored at said selected remote site; and playing said selected message on said message playback device at said selected remote site *when a caller is placed on hold*.

24. [A method as claimed in claim 22, further comprising the steps of:] *A method of programming message playback devices located at multiple remote sites, comprising the steps of:*

*storing a library of discrete and individually accessible messages at each of said remote sites;*

*storing at least one of a title and an identification code for uniquely identifying each said message at a computer located remotely with respect to said message playback devices;*

*storing site data relating to at least a selected one of said remote sites at said computer;*

*selecting at least one said message from said library for play at said selected remote site using said computer;*

*generating a control signal using said computer for said message playback device corresponding to said selected remote site to play said selected message; and*

*transmitting said control signal to at least said selected remote site;* defining a subset of said remote sites using a unique region code, said control signal comprising said region code, said transmitting step comprising the step of transmitting said control signal at least to all of said [emote] *remote* sites in said subset;

receiving said control signal at each of said remote sites in said subset;

accessing said selected message from said library stored at said remote sites in said subset; and playing said selected message on said message playback device at each of said remote sites in said subset.

25. [A method as claimed in claim 22.] *A method of programming message playback devices located at multiple remote sites, comprising the steps of:*

*storing a library of discrete and individually accessible messages at each of said remote sites;*

*storing at least one of a title and an identification code for uniquely identifying each said message at a computer located remotely with respect to said message playback devices;* storing site data relating to at least a selected one of said remote sites at said computer;

selecting at least one said message from said library for play at said selected remote site using said computer; and generating a control signal using said computer for said message playback device corresponding to said selected remote site to play said selected message; and transmitting said control signal to at least said selected remote site;

wherein said messages are stored on at least one optical disc at each of said remote sites and each of said remote sites comprises an optical disc player, said generating step comprising the steps of:

converting said identification code of said selected message into a number for a corresponding track on said optical disc at said selected remote site; and generating a command for said optical disc player at said selected remote site to advance to said track and play said selected message.

26. A method of programming message playback devices located at multiple remote sites *and communicating with respective telephone systems*, the method comprising the steps of:

storing a library of discrete and individually accessible messages at each of said remote sites;

storing message data for each said message at a first computer located remotely with respect to said message playback devices;

storing site data relating to at least two selected said remote sites at said first computer;

selecting different sets of said messages from said library using said first computer for play at respective said selected remote sites;

generating control signals for commanding said message playback devices corresponding to said selected remote sites to play respective said sets of messages *when callers are placed on hold on the respective telephone systems*; and transmitting said control signals to at least said selected remote sites.

27. A method as claimed in claim 26, further comprising the steps of:

receiving said control signals at said selected remote sites;

accessing said sets of messages from said library at respective said selected remote sites in accordance with said control signals; and playing said sets of messages on said message playback devices at respective said selected remote sites *when callers are placed on hold*.

28. A method of programming message playback devices located at multiple remote sites *and communicating with respective telephone systems*, the method comprising the steps of:

storing a library of discrete and individually accessible messages at each of said remote sites *for playback on the respective message playback device when a caller is placed on hold*, each message being uniquely identified by at least one of an identification code and a title;

storing said at least one of said identification code and said title for each said message at a computer located remotely with respect to said message playback devices;

storing site data relating to said remote sites at said computer;

generating at least one computer screen using said computer to display a list of location names corresponding to said remote sites and a list of each said message;

entering playlist data using said at least one computer screen selected from the group consisting of said identification codes of selected ones of said messages, said titles of selected ones of said messages, times for commencing the play of said messages, and selected ones of said remote sites at which said messages are to be played;

generating a control signal using said playlist data; and transmitting said control signal to said remote sites.

30. A programmable message delivery system for playing messages comprising:

a storage device for storing discrete, individually accessible messages;

a processor connected to said storage device and programmable to access at least one of said messages;

an input device connected to said processor;

a display device connected to said processor; and at least one message output apparatus selected from the group consisting of a music on-hold-compatible telephone system, a public address system, a visual display device, an electronically-controlled sign, an audiovisual apparatus, a videoconferencing device, and a multimedia announcement device, said message output apparatus comprising an input and an output, said processor being programmable to generate at least one screen on said display device to display message data relating to each of said messages, said message data selected from the group consisting of a message titles corresponding to respective ones of said messages, message identification codes corresponding to respective said messages, and text of at least one of said messages, said processor being programmable to allow an operator to select at least one of said messages using said message data and said input devices to access said selected message via said storage device and to provide said selected message to said input of said message output apparatus for play through said output of said message output apparatus *when a caller is placed on hold*.

32. A message playback device for playing selected messages from an optical disc, the message playback device being remotely controllable via a broadcast transmission system and comprising:

an optical disc system for playing at least one optical disc and providing signals generated therefrom to an output *in communication with a telephone system*;

a first processor being programmed to generate control signals to control operation of said optical disc system;

a receiver unit; and a second processor connected to said first processor and to said receiver unit, said receiver unit being operable to receive command signals transmitted thereto from said broadcast transmission system and to provide said command signals to said second processor, said command signals identifying selected tracks on said at least one optical disc, said second processor being programmed to convert said command signals into corresponding ones of said control signals to play said selected tracks on said optical disc system *when a caller is placed on hold on the telephone system* and to provide said corresponding ones of said control signals to said first processor until different said tracks on said at least one optical disc are selected.

33. A programmable message delivery system for playing messages on message playback devices at one or more remote sites *and communicating with one or more respective telephone systems*, the message delivery system comprising:

a communication link;

a plurality of message playback devices, each of said message playback devices comprising a storage device for storing messages and for playing selected ones of said messages through an output of said message playback device *when callers are placed on hold on the respective telephone systems*; and a computer remotely located from said plurality of message playback devices and operable to generate and transmit control signals via said communication link for controlling at least one of said plurality of message playback devices;

each of said plurality of message playback devices being adapted to receive said control signals via said communication link and being programmable to access at least one of said messages from said storage device and to provide said accessed message to said output in accordance with said control signals;

wherein said message playback device comprises an optical disc player, a processing device, a disc having tracks for storing said messages, and a receiver adapted to receive said control signals via said communication link, said control signals comprising commands for said processing device to control said optical disc play access to at least a selected one of said tracks and play a corresponding one of said messages *when the caller is placed on hold*.

34. A remotely controllable message playback device for playing selected messages from an optical disc *when callers are placed on hold*, the device comprising:

an optical disc system *communicating with a telephone system* for playing at least one optical disc and providing signals generated therefrom to an output *when a caller is placed on hold*;

a first processor being programmed to generate control signals to control operation of said optical disc system;

a receiver unit; and a second processor connected to said first processor and to said receiver unit, said receiver unit being operable to receive command signals transmitted thereto and to provide said command signals to said second processor, said second processor being programmed to convert said command signals into corresponding ones of said control signals and to provide said corresponding ones of said control signals to said first processor;

wherein said command signals are selected from the group consisting of a radio frequency signal and a wireline communication signal.

35. A remotely controllable message playback device [as claimed in claim 34.] *for playing selected messages from an optical disc comprising*:

an optical disc system for playing at least one optical disc and providing signals generated therefrom to an output;

a first processor being programmed to generate control signals to control operation of said optical disc system;

a receiver unit; and a second processor connected to said first processor and to said receiver unit, said receiver unit being operable to receive command signals transmitted thereto and to provide said command signals to said second processor, said second processor being programmed to convert said command signals into corresponding ones of said control signals and to provide said corresponding ones of said control signals to said first processor;

wherein said command signals are radiopaging signals, said receiver unit being configured to demodulate radiopaging signals and to provide said demodulated signals to said processor.

37. *A programmable message delivery system for playing messages on message playback devices at one or more remote sites comprising*:

*a communication link;*

*a plurality of message playback devices communicating with respective telephone systems, each of said message playback devices comprising a storage device for storing messages and for playing selected ones of said messages through an output of said message playback device; and*

*a computer remotely located from said plurality of message playback devices and operable to generate and transmit control signals via said communication link for controlling at least one of said plurality of message playback devices;*

*each of said plurality of message playback devices being adapted to receive said control signals via said communication link, said control signals comprising identification data for identifying selected ones of said plurality of message playback devices and list data for identifying selected ones of said messages for playback by respective ones of said selected message playback devices when a caller is placed on hold on the respective telephone system, each of said selected message playback devices being programmable to access said messages identified therefor in said list data from said storage device and to provide said messages to said output until different ones of said messages are selected.*

*38. A system as claimed in claim 37, wherein said communication link is selected from the group consisting of a microwave link, a radio frequency link, a satellite link, a public switched telephone network, a private switched telephone network, a digital communications network, the Internet, and a fiber optic network.*

*39. A system as claimed in claim 37, wherein said message playback device comprises a processing device, a storage device for storing said messages as respective files, and a receiver adapted to receive said control signals via said communication link, said computer being programmable to generate said control signals comprising commands for said processing device to access at least a selected one of said files to play a corresponding one of said messages through said output.*

* * * * *